United States Patent
Yu

(10) Patent No.: US 10,070,288 B2
(45) Date of Patent: Sep. 4, 2018

(54) METHOD FOR DYNAMICALLY SWITCHING MOBILE NETWORK, SUBSCRIPTION MANAGER, AND USER EQUIPMENT

(71) Applicant: HUAWEI TECHNOLOGIES CO., LTD., Shenzhen (CN)

(72) Inventor: Yijun Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 42 days.

(21) Appl. No.: 15/003,877

(22) Filed: Jan. 22, 2016

(65) Prior Publication Data

US 2016/0142855 A1 May 19, 2016

Related U.S. Application Data

(63) Continuation of application No. PCT/CN2013/080098, filed on Jul. 25, 2013.

(51) Int. Cl.
*H04M 3/00* (2006.01)
*H04W 4/50* (2018.01)
(Continued)

(52) U.S. Cl.
CPC ............ *H04W 4/50* (2018.02); *H04W 4/001* (2013.01); *H04W 4/005* (2013.01); *H04W 4/70* (2018.02);
(Continued)

(58) Field of Classification Search
CPC ..... H04W 36/14; H04W 48/06; H04W 4/001; H04W 4/005; H04W 60/005; H04W 76/027
(Continued)

(56) References Cited

U.S. PATENT DOCUMENTS

| 9,288,724 B1* | 3/2016 | Narang ............. H04W 36/0066 |
| 2010/0203865 A1* | 8/2010 | Horn ...................... H04W 48/16 |
| | | 455/411 |

(Continued)

FOREIGN PATENT DOCUMENTS

| CN | 102014376 A | 4/2011 |
| CN | 102026150 | 4/2011 |

(Continued)

OTHER PUBLICATIONS

Japanese Office Action dated Jan. 10, 2017 in corresponding Japanese Patent Application No. 2016-528280.

(Continued)

*Primary Examiner* — Joseph Arevalo
(74) *Attorney, Agent, or Firm* — Staas & Halsey LLP

(57) ABSTRACT

The present invention discloses a method for dynamically switching a mobile network, including: sending, by a subscription manager SM, a mobile network switch message to a first mobile network, where the mobile network switch message is used to indicate that user equipment UE needs network switching; receiving, by the SM, a notification signaling message from the first mobile network, where the notification signaling message is used to notify the SM that the UE connects to the first mobile network; and sending, by the SM, the mobile network switch message to the UE by using the first mobile network, so as to instruct the UE to switch to a second mobile network. The present invention further discloses a subscription manager and user equipment.

14 Claims, 14 Drawing Sheets

(51) Int. Cl.
*H04W 4/70* (2018.01)
*H04W 8/06* (2009.01)
*H04W 4/00* (2018.01)
*H04W 36/14* (2009.01)
*H04W 60/00* (2009.01)
*H04W 88/06* (2009.01)
*H04W 88/08* (2009.01)

(52) U.S. Cl.
CPC ............ *H04W 8/06* (2013.01); *H04W 36/14* (2013.01); *H04W 60/005* (2013.01); *H04W 88/06* (2013.01); *H04W 88/085* (2013.01)

(58) Field of Classification Search
USPC ... 455/456.1, 457, 419, 439, 436, 442, 63.1, 455/411, 404.1, 424, 433, 522, 445, 428, 455/406, 450, 413, 101, 354, 435.1, 426, 455/460
See application file for complete search history.

(56) References Cited

U.S. PATENT DOCUMENTS

| | | | | |
|---|---|---|---|---|
| 2012/0207023 | A1* | 8/2012 | Tsuda | H04W 48/06 370/235 |
| 2012/0329521 | A1 | 12/2012 | Jacobs et al. | |
| 2013/0012165 | A1* | 1/2013 | Popovich | H04L 63/08 455/411 |
| 2013/0157673 | A1 | 6/2013 | Brusilovsky | |
| 2013/0250891 | A1 | 9/2013 | Zhang et al. | |
| 2013/0301614 | A1* | 11/2013 | Lu | H04W 36/0022 370/331 |
| 2014/0301308 | A1* | 10/2014 | Hahn | H04W 76/021 370/329 |
| 2015/0065080 | A1* | 3/2015 | Suh | H04W 4/22 455/404.1 |
| 2015/0350880 | A1* | 12/2015 | Li | H04W 8/20 370/331 |
| 2015/0359026 | A1 | 12/2015 | Iwai et al. | |
| 2015/0382295 | A1* | 12/2015 | Hassan | H04L 47/125 370/235 |
| 2016/0037435 | A1* | 2/2016 | Yu | H04W 48/06 370/230 |
| 2016/0142855 | A1* | 5/2016 | Yu | H04W 8/06 455/419 |

FOREIGN PATENT DOCUMENTS

| | | |
|---|---|---|
| CN | 102076124 A | 5/2011 |
| CN | 102204295 A | 9/2011 |
| CN | 102209317 A | 10/2011 |
| CN | 102404710 A | 4/2012 |
| WO | 2011/083096 A1 | 7/2011 |
| WO | 2011/085611 A1 | 7/2011 |
| WO | WO 2014/097517 A1 | 6/2014 |

OTHER PUBLICATIONS

"Liaison Statement on new Work Item for eUICC", ETSI TC SCP Meeting #48, European Telecommunication Standards Institute, Mar. 2-4, 2011, Sophia Antipolis, France, pp. 2-42, 43/E, [URL: http://www.3gpp.org/ftp/tsg_sa/WG1_Serv/TSGS1_57_Kyoto/docs/S1-120233.zip].

International Search Report dated May 19, 2014, in corresponding International Application No. PCT/CN2013/080098.

"Reprogrammable SIMs: Technology, Evolution and Implication Final Report", CSMG a TMNG Global Company, Sep. 25, 2012, pp. 1-95.

International Search Report dated May 19, 2014 in corresponding International Patent Application No. PCT/CN2013/080098.

Extended European Search Report dated May 25, 2016 in corresponding European Patent Application No. 13889939.8.

Chinese Office Action dated Oct. 23, 2017 from Chinese Patent Application No. 201380000934.9, 12 pages.

* cited by examiner

METHOD FOR DYNAMICALLY SWITCHING MOBILE NETWORK, SUBSCRIPTION MANAGER, AND USER EQUIPMENT

CROSS-REFERENCE TO RELATED APPLICATIONS

This application is a continuation of International Application No. PCT/CN2013/080098, filed on Jul. 25, 2013, which is hereby incorporated by reference in its entirety.

TECHNICAL FIELD

The present invention relates to the field of computer and communications technologies, and in particular, to a method for dynamically switching a mobile network, a subscription manager, and user equipment.

BACKGROUND

Mobile communications technologies are used to support user equipment (User Equipment, UE) in connecting to the Internet by using a mobile network. A cellular network is a typical mobile network, and includes GPRS (General Packet Radio System, general packet radio system), UMTS (Universal Mobile Telecommunications System, Universal Mobile Telecommunications System), and EPS (Evolved Packet System, evolved packet system), where GPRS, UMTS, and EPS are generally referred to as 2G, 3G, and 4G for short. A wireless local area network WLAN (Wireless Local Area Network) is also a typical mobile network, generally referred to as WiFi.

Before a UE can connect to a mobile network, a subscriber first needs to perform subscription with an operator who is responsible for operating the mobile network, acquire an authorized SIM (Subscriber Identity Module, subscriber identity module) card, and place the SIM card into the user equipment. A SIM card is a typical UICC (Universal Integrated Circuit Card, universal integrated circuit card). The SIM card provided by the forgoing operator includes information about the mobile network operated by the operator, for example, a PLMN ID (Public Land Mobile Network Identifier, public land mobile network identifier) and an encryption algorithm of the mobile network. When the UE is powered on and performs a network registration (for example, Attach, attach) procedure, a mobile network device (for example, an HSS, Home Subscriber Server, home subscriber server) determines, according to subscription information provided by the SIM card, that the registration is valid, and therefore accepts a registration request.

As the mobile network is more widely applied to the field of machine-to-machine communication, such as automatic meter reading, field data collection, and logistics tracking, user equipment for the foregoing machine-to-machine communication includes an authorized SIM card, and therefore can connect to the mobile network by using wireless technologies, and interact with a service server. Due to particularity of the machine-to-machine communication, after a terminal in which a SIM card is placed is properly installed, it is relatively difficult to replace the SIM card subsequently. For example, the terminal is located in a remote area or embedded inside an instrument. In addition, a relatively large quantity of devices for the machine-to-machine communication is generally distributed. Even though replacement can be performed, replacement workload is relatively heavy, and costs are relatively high. Therefore, when user equipment in which a SIM card is installed and that is used for the machine-to-machine communication is activated, if a service provider needs to switch a mobile network, high costs need to be spent in replacing the SIM card in the user equipment. In some cases, replacement even cannot be implemented, which brings many difficulties to service provisioning in the machine-to-machine communication.

To resolve the foregoing problem, standardization organizations, such as GSMA (Global System for Mobile Communications Association, Global System for Mobile Communications Association) and ETSI (European Telecommunications Standards Institute, European Telecommunications Standards Institute) propose defining a technology of a new type of UICC, so that an operator or a service provider can dynamically switch a home mobile network (that is, a mobile network with which the UICC performs subscription) of the UICC, that is, switch a home mobile network of user equipment in which the UICC is installed. The technology of the new type of UICC is referred to as an embedded UICC (Embedded UICC, eUICC), which is used to upgrade an UICC card and enable dynamic update of mobile network information (such as a PLMN ID and a security algorithm) in the UICC. In addition, a subscription manager (Subscription Manager, SM) is deployed on a network side, so as to control and manage the mobile network information in the embedded UICC, as shown in FIG. 1.

In an architecture in FIG. 1, an MN is a Mobile Network, that is, mobile network. An SM may communicate with multiple mobile networks MNs of one operator, or may communicate with multiple mobile networks MNs of different operators. The multiple mobile networks may be mobile networks of a same type, for example, all are cellular networks; or may be mobile networks of different types, for example, a combination of cellular networks and wireless local area networks. User equipment in which an eUICC is placed may connect to any one of the mobile networks (such as an MN1 in FIG. 1), and connect to the SM. When the SM instructs the user equipment to switch a mobile network, the user equipment may connect to a specified mobile network, such as an MN2 in FIG. 1.

To meet a requirement that the SM dynamically controls the UE in which the eUICC is installed to perform mobile network switching processing, the UE needs to first attach to a mobile network, such as the MN1 in FIG. 1, of an operator with which the UE originally performs subscription, and establish a data channel so as to access the SM. When receiving a request message of the UE, the SM sends new mobile network information to the UE by using the MN1. After updating mobile network information, the UE initiates attachment to the MN2, and implements the mobile network switching processing. In an EPS network, a specific process is shown in FIG. 2.

Step 1: A UE sends an attach request (Attach Request) message to an MME (Mobility Management Entity, mobility management entity), and initiates a procedure of attach to an MN1.

Step 2: The MME and a home location register/home subscriber register (Home Location Register/Home Subscriber Server, HLR/HSS) execute an authentication procedure and a location update procedure of the UE.

Step 3: The MME sends a create session request (Create Session Request) message to an SGW/a PGW (serving gateway/packet data network gateway), and establishes a default bearer (default bearer).

Step 4: The PGW/SGW sends a create session response (Create Session Response) message to the MME.

Step 5: The MME sends an attach accept (Attach Accept) message to the UE, and implements the procedures of attachment and default bearer establishment.

Step 6: The UE interacts with an SM to acquire new mobile network information.

Step 7: The UE initiates, according to the acquired new mobile network information, processing of attachment to a new mobile network, and registers with the new mobile network, so as to implement mobile network switching.

The foregoing process of mobile network switching is applicable to mobile network switching processing in a case in which the UE can normally attach to a network. However, due to the particularity of the machine-to-machine communication, the UE may fail to interact with the SM within a mobile network switching period, and therefore cannot normally implement mobile network switching. For example, to save power, the UE is automatically powered off when there is no service; or for a vehicle-mounted device, a subscriber turns off or stops using the device. This case is relatively common in a machine-to-machine communication scenario. In addition, because an operator and a service provider (Service Provider) cooperate according to a commercial contract, when the service provider switches a mobile network of the operator, the original operator is responsible for continuing to provide services for user equipment of the service provider within a switching period, so as to implement mobile network switching. However, the switching period generally has a limit, and after the period expires, the original operator is no longer responsible for continuing to provide a network connection service for the UE of the service provider. In this case, after the mobile network switching period expires, because the UE that previously cannot successfully implement a mobile network switching operation has only original mobile network information, the UE cannot connect to the original mobile network or interact with the SM. As a result, the UE loses contact with the service provider, and a service loss is caused.

SUMMARY

Embodiments of the present invention provide a method for dynamically switching a mobile network, a subscription manager, and user equipment, which are used to resolve a problem that a UE cannot be switched to a mobile network in a case in which the UE is powered off, cannot connect to an original mobile network, or the like.

To resolve the foregoing technical problem, the embodiments of the present invention disclose the following technical solutions:

According to a first aspect, a method for dynamically switching a mobile network is provided, including steps:

sending, by a subscription manager SM, a mobile network switch message to a first mobile network, where the mobile network switch message is used to indicate that user equipment UE needs network switching;

receiving, by the SM, a notification signaling message from the first mobile network, where the notification signaling message is used to notify the SM that the UE intends to connect to the first mobile network; and sending, by the SM, the mobile network switch message to the UE by using the first mobile network, so as to instruct the UE to switch to a second mobile network.

In a first possible implementation manner of the first aspect, the notification signaling message includes at least one of the following items:

location information of the UE, a PLMN ID of a network available to the UE, an AP ID of a wireless local area network available to the UE, and an SSID of the wireless local area network available to the UE.

In a second possible implementation manner of the first aspect, the sending, by a subscription manager SM, a mobile network switch message to a first mobile network includes:

sending, by the subscription manager SM, the mobile network switch message to the first mobile network through a pre-established data channel.

In a third possible implementation manner of the first aspect, the mobile network switch message includes address information of the SM.

In a fourth possible implementation manner of the first aspect, the mobile network switch message includes subscription information, on the second mobile network, of the UE.

In a fifth possible implementation manner of the first aspect, the method further includes:

sending, by the SM, an activate profile request to the second mobile network, where the activate profile request is used to request the second mobile network to activate subscription data, on the second mobile network, of the UE.

According to a second aspect, a method for dynamically switching a mobile network is provided, including:

sending, by user equipment UE, a first-network connection request to a network device of a first mobile network;

receiving, by the UE, a first-network connection accept message from the network device of the first mobile network, where the first-network connection accept message includes a mobile network switch message that is used to instruct the UE to switch a mobile network, where the mobile network switch message comes from a subscription manager SM; and connecting to, by the UE, a second mobile network according to the mobile network switch message.

In a first possible implementation manner of the second aspect, the mobile network switch message includes subscription information, on the second mobile network, of the UE.

In a second possible implementation manner of the second aspect, the first-network connection request is an attach request, and the first-network connection accept message is an attach accept.

In a third possible implementation manner of the second aspect, the network device of the first mobile network is a mobility management entity device MME.

In a fourth possible implementation manner of the second aspect, after the sending, by user equipment UE, a first-network connection request to a network device of a first mobile network, and before the receiving a first-network connection accept message, the method further includes:

receiving, by the UE, a first-network connection response message of the network device of the first mobile network, where the first-network connection response message includes the mobile network switch message, and the mobile network switch message comes from the subscription manager SM; and sending, by the UE, a location response message to the network device of the first mobile network, where the location response message includes a PLMN ID of the UE.

In a fifth possible implementation manner of the second aspect, the first-network connection response message is an attach reject, and the location response message is an attach request; or the first-network connection response message is an eUICC request message, and the location response message is an eUICC response message.

In a sixth possible implementation manner of the second aspect, the network device of the first mobile network is a serving GPRS support node device.

In a seventh possible implementation manner of the second aspect, after the receiving, by the UE, a first-network connection accept message from the network device of the first mobile network, the method further includes:

sending, by the UE, an activate PDP context request to the network device of the first mobile network, and receiving an activate PDP context request response returned by the network device, where the activate PDP context request includes the mobile network switch message.

According to a third aspect, a method for dynamically switching a mobile network is provided, including:

receiving, by a network device of a first mobile network, a mobile network switch message sent by a subscription manager SM, where the mobile network switch message is used to instruct user equipment UE to switch a mobile network;

sending, by the network device of the first mobile network to the subscription manager SM, a notification signaling message that is used to notify the SM that the user equipment UE intends to connect to the first mobile network; and receiving, by the network device of the first mobile network, the mobile network switch message from the SM, where the mobile network switch message is used to instruct the UE to connect to a second mobile network.

In a first possible implementation manner of the third aspect, the mobile network switch message includes subscription information, on the second mobile network, of the UE.

In a second possible implementation manner of the third aspect, the notification signaling message includes at least one of the following items:

location information of the UE, a PLMN ID of a network available to the UE, an AP ID of a wireless local area network available to the UE, and an SSID of the wireless local area network available to the UE.

In a third possible implementation manner of the third aspect, the network device includes an HSS or an HLR.

In a fourth possible implementation manner of the third aspect, the method further includes:

receiving, by the HSS or the HLR, an authentication request or a location update request that is sent by a mobility management entity MME; and returning an authentication response or a location update response to the MME, where the authentication response or the location update response includes the mobile network switch message.

In a fifth possible implementation manner of the third aspect, the mobile network switch message includes address information of the SM.

In a sixth possible implementation manner of the third aspect, the network device includes a mobility management entity MME.

In a seventh possible implementation manner of the third aspect, the method further includes:

receiving, by the MME, a first-network connection request from the UE; and sending, by the MME to the UE, a first-network connection accept message that includes the mobile network switch message.

In an eighth possible implementation manner of the third aspect, the first-network connection request is an attach request, and the first-network connection accept message is an attach accept.

In a ninth possible implementation manner of the third aspect, the method further includes:

sending, by the MME, an authentication request or a location update request to an HSS or an HLR after receiving the first-network connection request;

receiving, by the MME, an authentication response or a location update response that is returned by the HSS or the HLR, where the authentication response or the location update response includes the mobile network switch message, and the mobile network switch message comes from the subscription manager SM;

returning, by the MME, a first-network connection response message to the UE, where the first-network connection response message includes the mobile network switch message; and receiving, by the MME, a location response message sent by the UE, where the location response message includes a PLMN ID of the UE.

In a tenth possible implementation manner of the third aspect, the method further includes:

sending, by the MME, an authentication request or a location update request to an HSS or an HLR after receiving the first-network connection request;

receiving, by the MME, an authentication response or a location update response that is returned by the HSS or the HLR, where the authentication response or the location update response includes the mobile network switch message; and sending, by the MME, a create session request to an SGW or a PGW, and receiving a create session response returned by the SGW or the PGW.

In an eleventh possible implementation manner of the third aspect, the MME sends the notification signaling message to the SM by using the HSS or the HLR, and receives, by using the HSS or the HLR, the mobile network switch message sent by the SM.

In a twelfth possible implementation manner of the third aspect, the authentication response or the location update response further includes address information of the SM, and the MME directly sends the notification signaling message to the SM by using the address information, and directly receives, by using the address information, the mobile network switch message sent by the SM.

In a thirteenth possible implementation manner of the third aspect, the network device includes an SGW or a PGW.

In a fourteenth possible implementation manner of the third aspect, the method further includes:

receiving, by the SGW or the PGW, a create session request of an MME, where the create session request includes the mobile network switch message;

creating, by the SGW or the PGW, a specific PCC rule; and returning, by the SGW or the PGW, a create session response to the MME.

In a fifteenth possible implementation manner of the third aspect, the specific PCC rule includes that only a packet for performing network switching is allowed to be transmitted, or that only a packet sent to the SM or received from the SM is allowed.

In a sixteenth possible implementation manner of the third aspect, the network device includes an SGSN.

In a seventeenth possible implementation manner of the third aspect, the method further includes:

receiving, by the SGSN, a first-network connection request from the UE; and sending, by the SGSN to the UE, a first-network connection accept message that includes the mobile network switch message.

In an eighteenth possible implementation manner of the third aspect, the first-network connection request is an attach request, and the first-network connection accept message is an attach accept.

In a nineteenth possible implementation manner of the third aspect, the method further includes:

sending, by the SGSN, an authentication request or a location update request to an HSS or an HLR after receiving the first-network connection request; and receiving, by the SGSN, an authentication response or a location update response that is returned by the HSS or the HLR, where the authentication response or the location update response includes the mobile network switch message.

In a twentieth possible implementation manner of the third aspect, the method further includes:

receiving, by the SGSN, an activate PDP context request sent by the UE, where the activate PDP context request includes the mobile network switch message;

sending, by the SGSN, a create PDP context request to a GGSN, an SGW, or a PGW, where the create PDP context request includes the mobile network switch message, or sending a create session request to the GGSN, the SGW, or the PGW, where the create session request includes the mobile network switch message;

receiving, by the SGSN, a create PDP context request response or a create session request response that is returned by the GGSN, the SGW, or the PGW; and returning, by the SGSN, an activate PDP context request response to the UE.

According to a fourth aspect, a subscription manager SM is provided, including:

a switch message sending unit, configured to send a mobile network switch message to a first mobile network, where the mobile network switch message is used to indicate that user equipment UE needs network switching;

a signaling message receiving unit, configured to receive a notification signaling message from the first mobile network, where the notification signaling message is used to notify the SM that the UE intends to connect to the first mobile network; and a switch indication unit, configured to send the mobile network switch message to the UE by using the first mobile network, so as to instruct the UE to switch to a second mobile network.

In a first possible implementation manner of the fourth aspect, the notification signaling message includes at least one of the following items:

location information of the UE, a PLMN ID of a network available to the UE, an AP ID of a wireless local area network available to the UE, and an SSID of the wireless local area network available to the UE.

In a second possible implementation manner of the fourth aspect, the switch indication unit is specifically configured to send the mobile network switch message to the first mobile network through a pre-established data channel.

In a third possible implementation manner of the fourth aspect, the mobile network switch message includes address information of the SM.

In a fourth possible implementation manner of the fourth aspect, the mobile network switch message includes subscription information, on the second mobile network, of the UE.

In a fifth possible implementation manner of the fourth aspect, the SM further includes: an activate profile requesting unit, configured to send an activate profile request to the second mobile network, where the activate profile request is used to request the second mobile network to activate subscription data, on the second mobile network, of the UE.

According to a fifth aspect, user equipment UE is provided, including:

a request sending unit, configured to send a first-network connection request to a network device of a first mobile network;

a message receiving unit, configured to receive a first-network connection accept message from the network device of the first mobile network, where the first-network connection accept message includes a mobile network switch message that is used to instruct the UE to switch a mobile network, where the mobile network switch message comes from a subscription manager SM; and a network switching unit, configured to connect to a second mobile network according to the mobile network switch message.

In a first possible implementation manner of the fifth aspect, the mobile network switch message includes subscription information, on the second mobile network, of the UE.

In a second possible implementation manner of the fifth aspect, the first-network connection request is an attach request, and the first-network connection accept message is an attach accept.

In a third possible implementation manner of the fifth aspect, the network device of the first mobile network is a mobility management entity device MME.

In a fourth possible implementation manner of the fifth aspect, the UE further includes:

a response message receiving unit, configured to receive a first-network connection response message of the network device of the first mobile network, where the first-network connection response message includes the mobile network switch message, and the mobile network switch message comes from the subscription manager SM; and a location information sending unit, configured to send a location response message to the network device of the first mobile network, where the location response message includes a PLMN ID of the UE.

In a fifth possible implementation manner of the fifth aspect, the first-network connection response message is an attach reject, and the location response message is an attach request; or the first-network connection response message is an eUICC request message, and the location response message is an eUICC response message.

In a sixth possible implementation manner of the fifth aspect, the network device of the first mobile network is a serving GPRS support node device.

In a seventh possible implementation manner of the fifth aspect, the UE further includes:

a context requesting unit, configured to: send an activate PDP context request to the network device of the first mobile network, and receive an activate PDP context request response returned by the network device, where the activate PDP context request includes the mobile network switch message.

According to a sixth aspect, a network device is provided, including:

a switch message receiving unit, configured to receive a mobile network switch message sent by a subscription manager SM, where the mobile network switch message is used to instruct user equipment UE to switch a mobile network;

a signaling message sending unit, configured to send, to the subscription manager SM, a notification signaling message that is used to notify the SM that the user equipment UE intends to connect to a first mobile network; and a switch indication receiving unit, configured to receive the mobile network switch message from the SM, where the mobile network switch message is used to instruct the UE to connect to a second mobile network.

In a first possible implementation manner of the sixth aspect, the mobile network switch message includes subscription information, on the second mobile network, of the UE.

In a second possible implementation manner of the sixth aspect, the notification signaling message includes at least one of the following items:

location information of the UE, a PLMN ID of a network available to the UE, an AP ID of a wireless local area network available to the UE, and an SSID of the wireless local area network available to the UE.

In a third possible implementation manner of the sixth aspect, the network device includes an HSS or an HLR.

In a fourth possible implementation manner of the sixth aspect, the network device further includes:

a request receiving unit, configured to receive an authentication request or a location update request that is sent by a mobility management entity MME; and a response returning unit, configured to return an authentication response or a location update response to the MME, where the authentication response or the location update response includes the mobile network switch message.

In a fifth possible implementation manner of the sixth aspect, the mobile network switch message includes address information of the SM.

In a sixth possible implementation manner of the sixth aspect, the network device includes a mobility management entity MME.

In a seventh possible implementation manner of the sixth aspect, the network device further includes:

a connection request receiving unit, configured to receive a first-network connection request from the UE; and an accept-message sending unit, configured to send, to the UE, a first-network connection accept message that includes the mobile network switch message.

In an eighth possible implementation manner of the sixth aspect, the first-network connection request is an attach request, and the first-network connection accept message is an attach accept.

In a ninth possible implementation manner of the sixth aspect, the network device further includes:

a request sending unit, configured to send an authentication request or a location update request to an HSS or an HLR after the first-network connection request is received;

a response receiving unit, configured to receive an authentication response or a location update response that is returned by the HSS or the HLR, where the authentication response or the location update response includes the mobile network switch message, and the mobile network switch message comes from the subscription manager SM;

a connection request responding unit, configured to return a first-network connection response message to the UE, where the first-network connection response message includes the mobile network switch message; and a location message receiving unit, configured to receive a location response message sent by the UE, where the location response message includes a PLMN ID of the UE.

In a tenth possible implementation manner of the sixth aspect, the network device further includes:

a request sending unit, configured to send an authentication request or a location update request to an HSS or an HLR after the first-network connection request is received;

a response receiving unit, configured to receive an authentication response or a location update response that is returned by the HSS or the HLR, where the authentication response or the location update response includes the mobile network switch message;

a create session requesting unit, configured to send a create session request to an SGW or a PGW; and a create session response receiving unit, configured to receive a create session response returned by the SGW or the PGW.

In an eleventh possible implementation manner of the sixth aspect, the signaling message sending unit is specifically configured to send the notification signaling message to the SM by using the HSS or the HLR; and the switch indication receiving unit is specifically configured to receive, by using the HSS or the HLR, the mobile network switch message sent by the SM.

In a twelfth possible implementation manner of the sixth aspect, the authentication response or the location update response further includes address information of the SM; the signaling message sending unit is specifically configured to directly send the notification signaling message to the SM by using the address information; and the switch indication receiving unit is specifically configured to directly receive, by using the address information, the mobile network switch message sent by the SM.

In a thirteenth possible implementation manner of the sixth aspect, the network device includes an SGW or a PGW.

In a fourteenth possible implementation manner of the sixth aspect, the network device further includes:

a create session request receiving unit, configured to receive a create session request of an MME, where the create session request includes the mobile network switch message;

a PCC rule creating unit, configured to create a specific PCC rule; and a create session response returning unit, configured to return a create session response to the MME.

In a fifteenth possible implementation manner of the sixth aspect, the specific PCC rule includes that only a packet for performing network switching is allowed to be transmitted, or that only a packet sent to the SM or received from the SM is allowed.

In a sixteenth possible implementation manner of the sixth aspect, the network device includes an SGSN.

In a seventeenth possible implementation manner of the sixth aspect, the network device further includes:

a connection request receiving unit, configured to receive a first-network connection request from the UE; and an accept-message sending unit, configured to send, to the UE, a first-network connection accept message that includes the mobile network switch message.

In an eighteenth possible implementation manner of the sixth aspect, the first-network connection request is an attach request, and the first-network connection accept message is an attach accept.

In a nineteenth possible implementation manner of the sixth aspect, the network device further includes:

a request sending unit, configured to send an authentication request or a location update request to an HSS or an HLR after the first-network connection request is received; and a response receiving unit, configured to receive an authentication response or a location update response that is returned by the HSS or the HLR, where the authentication response or the location update response includes the mobile network switch message.

In a twentieth possible implementation manner of the sixth aspect, the network device further includes:

a context request receiving unit, configured to receive an activate PDP context request sent by the UE, where the activate PDP context request includes the mobile network switch message; where the request sending unit is further configured to send a create PDP context request to a GGSN, an SGW, or a PGW, where the create PDP context request includes the mobile network switch message, or send a create session request to the GGSN, the SGW, or the PGW, where the create session request includes the mobile network switch message; and the response receiving unit is further configured to receive a create PDP context request response or a create session request response that is returned by the GGSN, the SGW, or the PGW; and a context request response returning unit, configured to return an activate PDP context request response to the UE.

In the embodiments of the present invention, an SM selects an available new mobile network, activates subscription data on the new mobile network, and instructs a UE to implement mobile network switching, so that a method for dynamically switching a UE to a mobile network is implemented, thereby allowing a service provider to dynamically switch, according to a requirement, a home mobile network for a UE in which an eUICC is installed. Particularly, after missing a mobile network switching period due to a situation such as a power outage or an out-of-service device, the UE can still implement mobile network switching by using the method provided in the embodiments, thereby ensuring smooth implementation of a service, and preventing the service provider from losing contact with the UE. The method that is put forward in the embodiments of the present invention may also be applied to network switching processing when the UE normally attaches to a first mobile network within the mobile network switching period.

BRIEF DESCRIPTION OF DRAWINGS

To describe the technical solutions in the embodiments of the present invention or in the prior art more clearly, the following briefly introduces the accompanying drawings required for describing the embodiments or the prior art. Apparently, the accompanying drawings in the following description show some embodiments of the present invention, and a person of ordinary skill in the art may still derive other drawings from these accompanying drawings without creative efforts.

DESCRIPTION OF EMBODIMENTS

To make the objectives, technical solutions, and advantages of the embodiments of the present invention clearer, the following clearly describes the technical solutions in the embodiments of the present invention with reference to the accompanying drawings in the embodiments of the present invention. Apparently, the described embodiments are a part rather than all of the embodiments of the present invention. All other embodiments obtained by a person of ordinary skill in the art based on the embodiments of the present invention without creative efforts shall fall within the protection scope of the present invention.

With reference to accompanying drawings and embodiments, the following further describes in detail specific implementation manners of the present invention. The following embodiments are used for illustrating the present invention, not for limiting the scope of the present invention.

A service provider and a first mobile network MN1 (an operator of the first mobile network) sign a service contract.

All devices (UEs for short), in which an eUICC is installed, of the service provider may access a service by using a network of the MN1, and have contact with an SM so as to accept management of the subscription manager SM. When the service provider needs to perform switching to a second mobile network (that is, an MN2), the SM instructs the UE to perform operator switching processing. The embodiments of the present invention mainly describe how to dynamically switch between the first mobile network and the second mobile network. Particularly, after missing a mobile network switching period due to a situation such as a power outage or an out-of-service device, the UE can still implement mobile network switching by using the method provided in the embodiments, thereby ensuring smooth implementation of a service, and preventing the service provider from losing contact with the UE. In the following embodiments, the first mobile network and the second mobile network may be Long Term Evolution networks (Long Term Evolution, LTE for short), 2G/3G networks, or the like.

Embodiment 1

Figure 1:
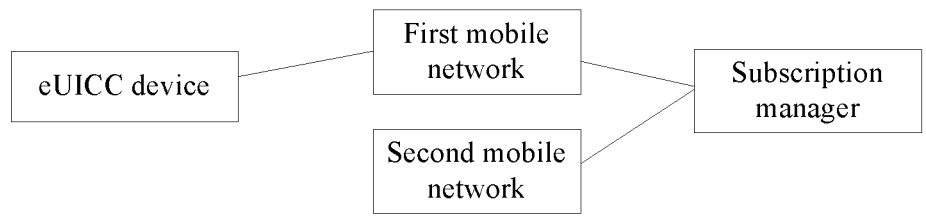
FIG. 1 is a diagram of an architecture of an eUICC in a method for switching a mobile network in the prior art.
Figure 2:
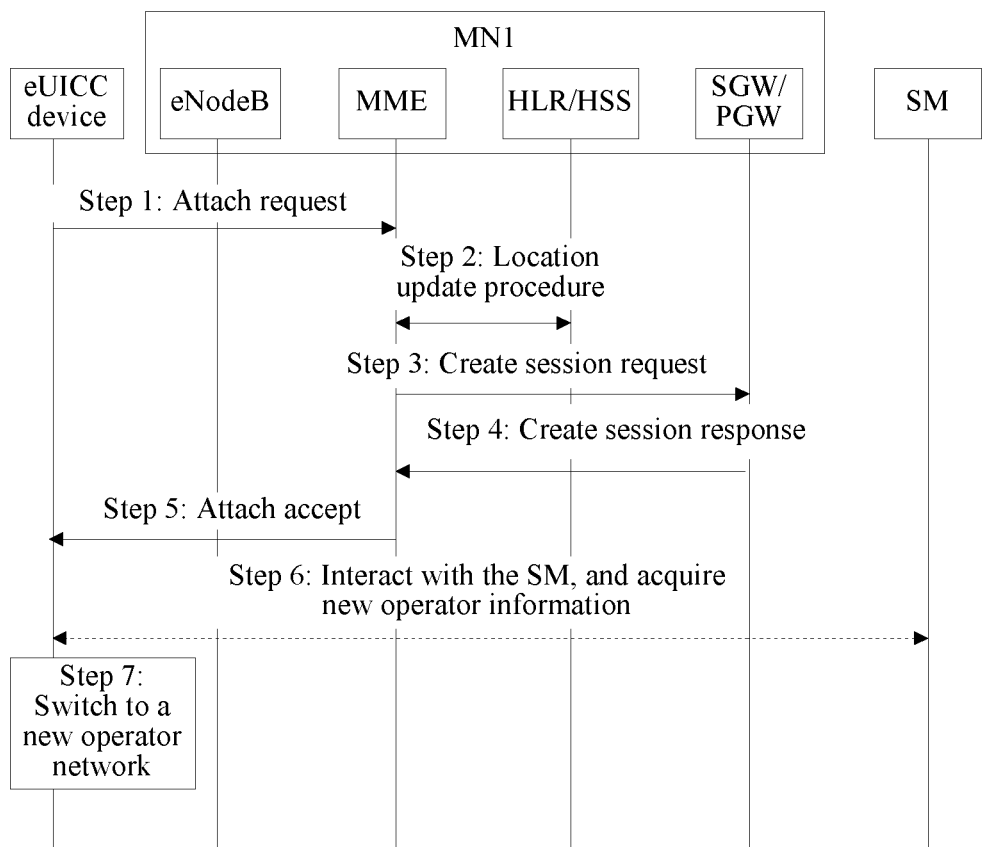
FIG. 2 is a flowchart of an existing method for switching a mobile network by using the architecture in FIG. 1.
Figure 3:
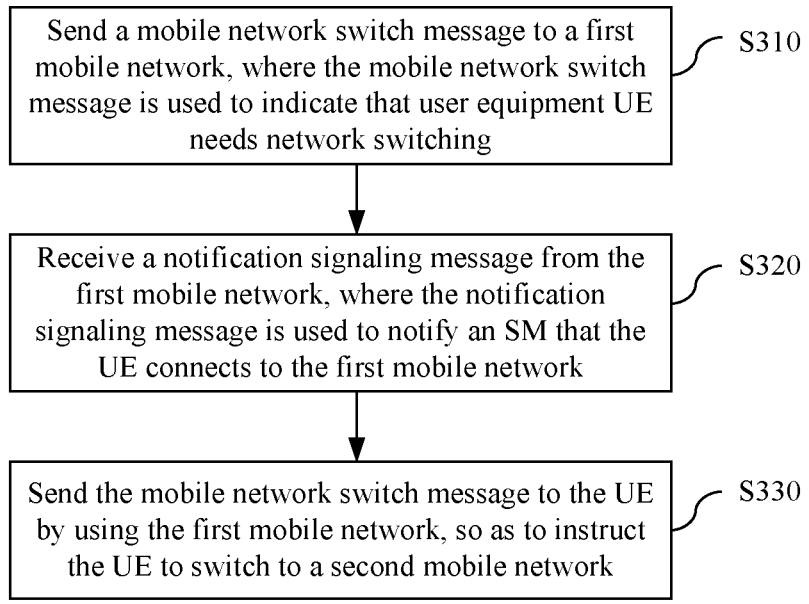
FIG. 3 is a schematic flowchart of an embodiment of a method for dynamically switching a mobile network according to the present invention.

FIG. 3 is a schematic flowchart of an embodiment of a method for dynamically switching a mobile network according to the present invention. The method in this embodiment is executed by a subscription manager SM, and the method may include:

Step S310: Send a mobile network switch message to a first mobile network, where the mobile network switch message is used to indicate that user equipment UE needs network switching. The mobile network switch message may include information about the second mobile network. The information about the second mobile network includes at least one of a mobile network type, a mobile network identifier, and a mobile network index, where the mobile network index is used to indicate a mobile network type and/or a mobile network identifier that are/is stored on user equipment.

In this embodiment, the SM sends the mobile network switch message to the first mobile network through a pre-established data channel. The pre-established data channel may be a wired or wireless network that is established between the SM and an HSS or an HLR on the first mobile network. The mobile network switch message is used to instruct a UE of a service provider on the first mobile network to switch a mobile network, where the UE may be all UEs of the service provider, or may be only a UE that does not successfully implement operator switching. The mobile network switch message may further include address information of the SM, and subscription information, on the second mobile network, of the UE.

Step S320: Receive a notification signaling message from the first mobile network, where the notification signaling message is used to notify the SM that the UE intends to connect to the first mobile network.

After the first mobile network receives the mobile network switch message sent by the SM to the first mobile network, and when the UE attempts to attach to the first mobile network, the first mobile network sends the notification signaling message to the SM, so as to notify the SM that the UE intends to connect to the first mobile network. The notification signaling message includes at least one of the following items: location information of the UE, a PLMN ID (Public Land Mobile Network ID) of a network available to the UE, an AP ID (Access Point ID) of a wireless local area network available to the UE, and a service set identifier SSID (Service Set Identifier) of the wireless local area network available to the UE. The first mobile network may use the HSS or the HLR to send the notification signaling message to the SM; or in a case in which an address of the SM is known, may use an MME to directly send the notification signaling message to the SM; or may use an SGW or a PGW to send the notification signaling message to the SM.

When the first mobile network stops serving a service provider, and when a UE of the service provider initiates an attachment, the first mobile network sends an attach reject response that also carries the mobile network switch message. After receiving the response, the UE sends an attach request that includes an eUICC capability of the UE, a PLMN ID, and the mobile network switch message. The first mobile network sends the notification signaling message to the SM according to the attach request, so as to notify the SM that the UE intends to connect to the first mobile network.

Step S330: Send the mobile network switch message to the UE by using the first mobile network, so as to instruct the UE to switch to a second mobile network.

If subscription data, on the second mobile network, of the UE has been activated on the second mobile network, after receiving the notification signaling message, the SM directly sends the mobile network switch message to the UE by using the first mobile network, so as to instruct the UE to switch to the second mobile network. If subscription data, on the second mobile network, of the UE is not activated on the second mobile network in advance, before the SM sends the mobile network switch message to the UE, the SM sends an activate profile request (which carries a UE ID, where the UE ID may be reported by the UE when the UE attaches to the first mobile network) to the second mobile network, where the activate profile request is used to request the second mobile network to activate the subscription data, on the second mobile network, of the UE.

After receiving the mobile network switch message (which may further include the subscription data, on the second mobile network, of the UE) that is sent by the SM to the UE, the first mobile network receives the attach request of the UE, and provides only an information exchange service related to network switching, so that the UE can be switched to the second mobile network by using the first mobile network.

The MME in this embodiment is a mobility management entity device on an LTE network. This embodiment is also applicable to another mobile network, including an SGSN, an MSC/a VLR, and the like on a 2G/3G network.

In this embodiment, an SM sends a mobile network switch message to a first mobile network and a corresponding UE, and the first mobile network provides the UE with only a corresponding service for performing mobile network switching, so that the UE can be successfully switched from the first mobile network to a second mobile network.

Embodiment 2

Figure 4:
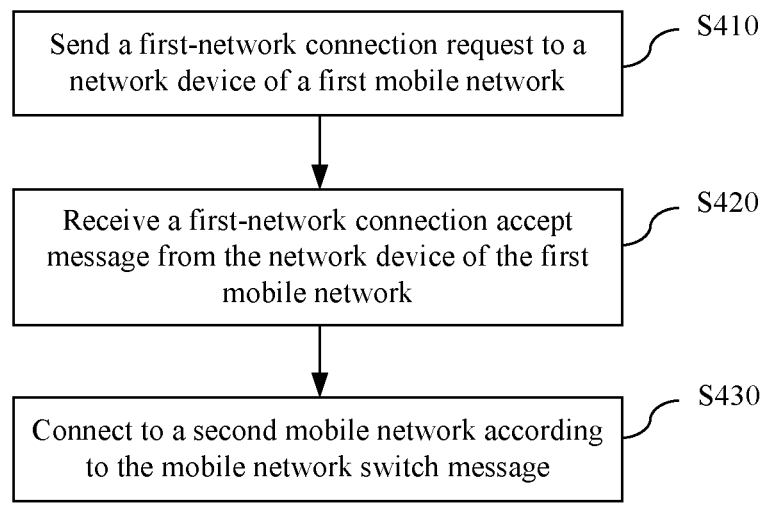
FIG. 4 is a schematic flowchart of another embodiment of a method for dynamically switching a mobile network according to the present invention.

FIG. 4 is a schematic flowchart of another embodiment of a method for dynamically switching a mobile network according to the present invention. The method in this embodiment is executed by user equipment UE, and the method may include:

Step S410: Send a first-network connection request to a network device of a first mobile network, where the first-network connection request is an attach request.

Step S420: Receive a first-network connection accept message from the network device of the first mobile network, where the first-network connection accept message includes a mobile network switch message that is used to instruct the UE to switch a mobile network, where the mobile network switch message comes from a subscription manager SM.

Optionally, in LTE, the network device is an MME, and after the sending, by the user equipment UE, a first-network connection request to a network device of a first mobile network, and before the receiving a first-network connection accept message, the method further includes:

receiving, by the UE, a first-network connection response message of the network device of the first mobile network, where the first-network connection response message includes the mobile network switch message, and the mobile network switch message comes from the subscription manager SM; and sending, by the UE, a location response message to the network device of the first mobile network, where the location response message includes a PLMN ID of the UE.

Because the first mobile network has stopped serving the UE of a corresponding service provider, and the first mobile network rejects the attach request in step S410, the first-network connection response message is an attach reject. After receiving a reject response, the UE sends again an attach request, that is, the location response message, to the network device of the first mobile network, where the location response message may further include the mobile network switch message.

The first-network connection response message may further be an eUICC request message, and the location response message is an eUICC response message.

After receiving the location response message of the UE, the first mobile network notifies the SM that the UE intends to connect to the first mobile network, and then the SM sends the mobile network switch message to the UE by using the first mobile network, where the mobile network switch message may include subscription information, on the second mobile network, of the UE. The first mobile network sends the mobile network switch message to the UE in a manner of adding the mobile network switch message into the first-mobile-network connection accept message, where the first-network connection accept message is an attach accept, that is, accepting attachment of the UE, and the first mobile network provides the UE with only a corresponding service for mobile network switching.

Step S430: Connect to a second mobile network according to the mobile network switch message.

Optionally, in 2G or 3G, the network device is a serving GPRS support node device, that is, an SGSN.

After the receiving, by the UE, a first-network connection accept message from the network device of the first mobile network, the method further includes: sending, by the UE, an activate PDP context request to the network device of the first mobile network, and receiving an activate PDP context request response returned by the network device, where the activate PDP context request includes the mobile network switch message.

In this embodiment, when failing to connect to a first mobile network, user equipment may be further switched to a second mobile network according to network switch indication information returned by the first mobile network, thereby ensuring that a service of the user equipment is normal when the first mobile network stops service.

Embodiment 3

Figure 5:
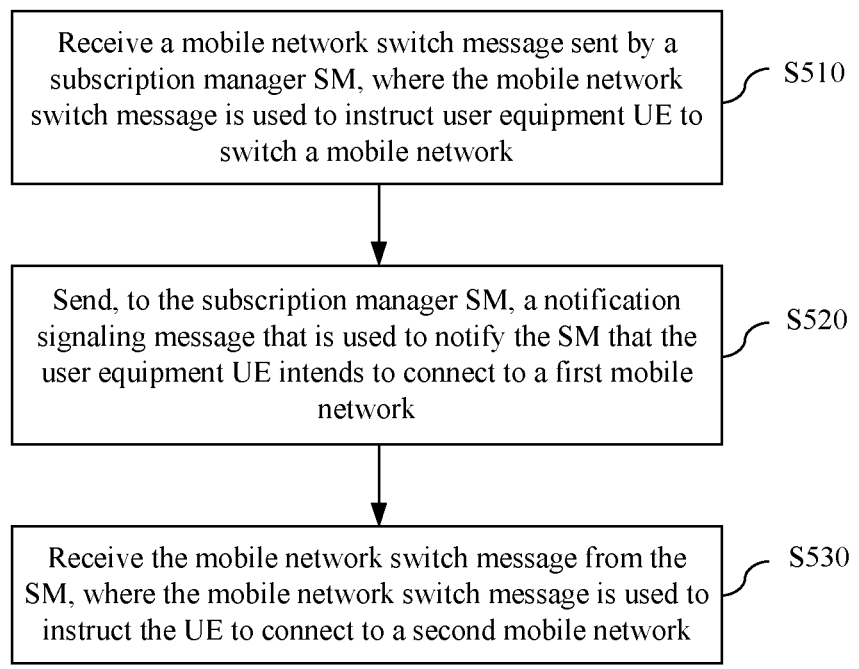
FIG. 5 is a schematic flowchart of still another embodiment of a method for dynamically switching a mobile network according to the present invention.

FIG. 5 is a schematic flowchart of still another embodiment of a method for dynamically switching a mobile network according to the present invention. The method in this embodiment is executed by a network device on a first mobile network side, and the method may include:

Step S510: Receive a mobile network switch message sent by a subscription manager SM, where the mobile network switch message is used to instruct user equipment UE to switch a mobile network. The mobile network switch message may include information about the second mobile network. The information about the second mobile network includes at least one of a mobile network type, a mobile network identifier, and a mobile network index, where the mobile network index is used to indicate a mobile network type and/or a mobile network identifier that are/is stored on user equipment.

Step S520: Send, to the subscription manager SM, a notification signaling message that is used to notify the SM that the user equipment UE intends to connect to the first mobile network. The notification signaling message includes at least one of the following items:

location information of the UE, a PLMN ID of a network available to the UE, an AP ID of a wireless local area network available to the UE, and an SSID of the wireless local area network available to the UE.

Step S530: The network device receives the mobile network switch message from the SM, where the mobile network switch message is used to instruct the UE to connect to the second mobile network. If subscription data, on the second mobile network, of the UE is not activated on the second mobile network in advance, the mobile network switch message includes subscription information, on the second mobile network, of the UE.

The following are methods executed by different network devices on the first mobile network, where the network devices have different roles and relationships with the SM in a mobile network switching process.

In this embodiment, the network device includes a home subscriber server HSS or a home location register HLR, and in step S510, the HSS or the HLR receives the mobile network switch message from the SM.

Between steps S510 and S520, the HSS or the HLR receives an authentication request or a location update request that is sent by a mobility management entity MME; and returns an authentication response or a location update response to the MME, where the authentication response or the location update response includes the mobile network switch message. In step S520, the HSS or the HLR may further send the notification signaling message to the SM, so as to notify the SM that the UE intends to connect to the first mobile network.

In this embodiment, for an LTE system, the network device includes a mobility management entity MME. The method executed by the MME further includes:

Step 1: The MME receives a first-network connection request from the UE, where the first-network connection request is an attach request.

Step 2: The MME sends, to the UE, a first-network connection accept message that includes the mobile network switch message, where the first-network connection accept message is an attach accept.

Optionally, between step 1 and step 2, the method further includes the following process in which the MME interacts with the UE, and an HSS or an HLR:

sending, by the MME, an authentication request or a location update request to the HSS or the HLR after receiving the first-network connection request;

receiving, by the MME, an authentication response or a location update response that is returned by the HSS or the HLR, where the authentication response or the location update response includes the mobile network switch message (which is received by the HSS or the HLR from the SM in step S510), and the mobile network switch message comes from the subscription manager SM;

returning, by the MME, a first-network connection response message to the UE, where the first-network connection response message includes the mobile network switch message; and receiving, by the MME, a location response message sent by the UE, where the location response message includes a PLMN ID of the UE and the like.

After the MME receives the location response message sent by the UE, in step S520, the MME sends the notification signaling message to the SM by using the HSS or the HLR, which may specifically be that the MME sends the location response message that includes the PLMN ID of the UE and the like to the HSS or the HLR, and the HSS or the HLR sends the notification signaling to the SM; in addition, in step S530, the MME receives, by using the HSS or the HLR, the mobile network switch message sent by the SM, and in step 2, sends the mobile network switch message to the UE.

Optionally, the authentication response or the location update response further includes address information of the SM, and the MME directly sends the notification signaling message to the SM by using the address information, and directly receives, by using the address information, the mobile network switch message sent by the SM.

Optionally, between step 1 and step 2, the method further includes the following process in which the MME interacts with the UE, and an HSS or an HLR:

sending, by the MME, an authentication request or a location update request to the HSS or the HLR after receiving the first-network connection request;

receiving, by the MME, an authentication response or a location update response that is returned by the HSS or the HLR, where the authentication response or the location update response includes the mobile network switch message (which is received by the HSS or the HLR from the SM in step S510); and sending, by the MME, a create session request to an SGW or a PGW, and receiving a create session response returned by the SGW or the PGW.

In this embodiment, the network device includes an SGW or a PGW. The method executed by the SGW or the PGW further includes:

receiving, by the SGW or the PGW, a create session request of an MME, where the create session request includes the mobile network switch message;

creating, by the SGW or the PGW, a specific PCC rule, where the specific PCC rule includes that only a packet for performing network switching is allowed to be transmitted, or that only a packet sent to the SM or received from the SM is allowed; and returning, by the SGW or the PGW, a create session response to the MME.

In this embodiment, for a 2G or a 3G system, the network device includes an SGSN. The method executed by the SGSN further includes:

receiving, by the SGSN, a first-network connection request from the UE; sending, by the SGSN, an authentication request or a location update request to an HSS or an HLR after receiving the first-network connection request; and receiving, by the SGSN, an authentication response or a location update response that is returned by the HSS or the HLR, where the authentication response or the location update response includes the mobile network switch message (which is received by the HSS or the HLR from the SM in step S510);

sending, by the SGSN to the UE, a first-network connection accept message that includes the mobile network switch message, where the first-network connection request is an attach request, and the first-network connection accept message is an attach accept;

after receiving the first-network connection accept message, sending, by the UE, an activate PDP context request to the SGSN;

receiving, by the SGSN, the activate PDP context request sent by the UE, where the activate PDP context request includes the mobile network switch message;

sending, by the SGSN, a create PDP context request to a GGSN, an SGW, or a PGW, where the create PDP context request includes the mobile network switch message, or sending a create session request to the GGSN, the SGW, or the PGW, where the create session request includes the mobile network switch message;

receiving, by the SGSN, a create PDP context request response or a create session request response that is returned by the GGSN, the SGW, or the PGW; and returning, by the SGSN, an activate PDP context request response to the UE.

Embodiment 4

Figure 6:
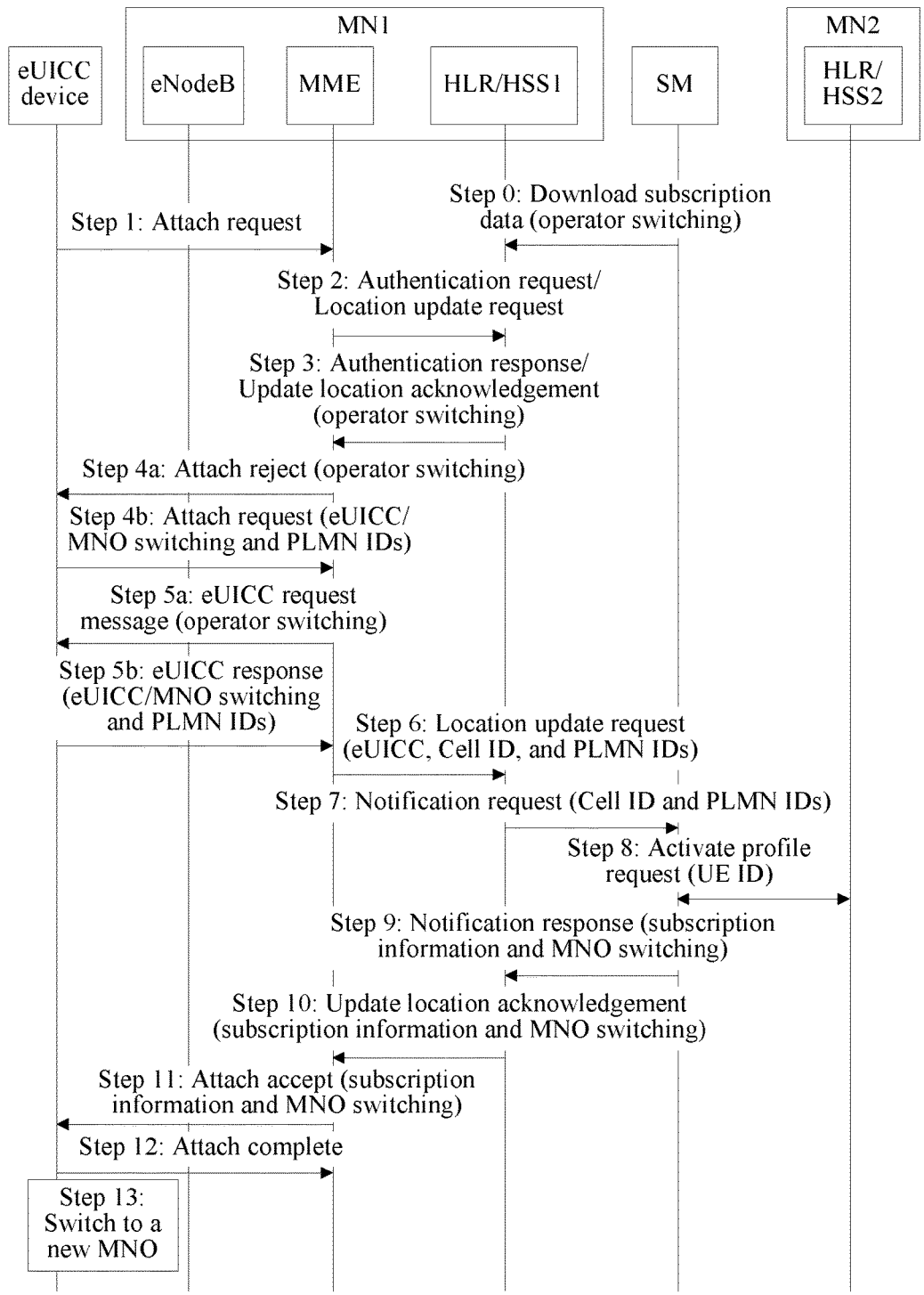
FIG. 6 is a schematic signaling diagram of still another embodiment of a method for dynamically switching a mobile network according to the present invention.

FIG. 6 is a schematic signaling diagram of still another embodiment of a congestion control method according to the present invention, and the method includes:

Step 0: A subscription manager SM sends a mobile network switch message to a subscription data server HLR/HSS1 (the HLR is a home location register, and the HSS is a home subscriber server, both of which are used to store subscription data, and either the HLR or the HSS may be selected herein) of a first mobile network MN1, so as to modify subscription information of a UE to "network switch (MN Switch)". The HLR/HSS records the "network switch (MN Switch)" indication of the UE. The UE may be all UEs of the service provider, or may be a single UE or some UEs that does or do not successfully implement network switching.

When the UE does not attach to the first mobile network (for example, information about an MME to which the UE currently attaches is not recorded in the HLR/HSS, or the information about the MME is invalid), the first mobile network does not execute a subsequent process until the UE initiates step 1.

When the UE has attached to the first mobile network (for example, valid information of an MME to which the UE currently attaches is recorded in the HLR/HSS), the method includes step 0a: the HLR/HSS sends a subscription data update request message (Subscription Update Request, that is, mobile network switch message) to the MME, where the message includes the "network switch (MN Switch)" indication. When the UE has attached to the MME, the MME performs step 5a. The method further includes step 0b: the MME sends a subscription data update acknowledgement message (Subscription Update Ack) to the HLR/HSS. There is no time sequence relationship between step 5a and step 0b.

Step 1: A UE in which an eUICC is installed sends an attach request Attach Request message to a mobility management entity device MME. The MME may be a device on the mobile network MN1 with which the UE originally performs subscription, or in a roaming case, the MME may be a device on a visited network having a roaming protocol with the MN1.

Step 2: The MME sends an authentication request (Authentication Request) message to the HLR/HSS1.

Step 3: The HLR/HSS1 determines, according to the recorded "network switch (MN Switch)" indication in step 0, that the UE needs to implement mobile network switching, and sends an authentication response (Authentication Response) message to the MME, where the update location acknowledgement message includes the "network switch (MN Switch)" indication.

The "network switch (MN Switch)" indication sent by the HLR/HSS1 to the MME may also be sent by the HLR/HSS1 to the MME in a location update procedure after the foregoing authentication (Authentication) procedure has been executed, that is, in step 2, the MME sends a location update request (Update Location Request) message to the HLR/HSS1, and in step 3, the HLR/HSS1 sends an update location acknowledgement (Update Location Ack) message to the MME, where the acknowledgement message includes the "network switch (MN Switch)" indication.

The MME performs the following steps 4a and 4b, or steps 5a and 5b.

Step 4a: The MME receives the "network switch (MN Switch)" indication and sends an Attach Reject message to the UE, where the message includes the "network switch (MN Switch)" indication.

Step 4b: The UE sends an Attach Request message to the MME according to the "network switch (MN Switch)" indication received in step 4a, where the message includes an eUICC capability indication of the UE or the network switch indication (MN Switch); the message may include PLMN ID information, where the PLMN ID information indicates a PLMN ID of an available cellular network around a location of the UE; and the message may further include AP ID information or SSID information, where the AP ID information or the SSID information indicates an AP ID or an SSID of an available wireless local area network around the location of the UE.

Step 5a: The MME sends an eUICC Request message to the UE according to the "network switch (MN Switch)" indication received in step 3, where the message may include the "network switch (MN Switch)" indication.

Step 5b: The UE sends an eUICC Response message to the MME, where the message includes an eUICC capability indication of the UE or the network switch indication (MN Switch); the message may include PLMN ID information, where the PLMN ID information indicates a PLMN ID of an available cellular network around a location of the UE; and the message may further include AP ID information or SSID information, where the AP ID information or the SSID information indicates an AP ID or an SSID of an available wireless local area network around the location of the UE.

Step 6: The MME sends a location update request (Update Location Request) message to the HLR/HSS1, where the message may include one or more pieces of information, such as the eUICC capability indication of the UE, current location information (such as a cell identity cell id or a location area identity RA/LA/TA) of the UE, the PLMN ID of the available cellular network around the UE, and the AP ID or the SSID of the available wireless local area network around the UE. The location information of the UE may be sent by an eNodeB to the MME while the eNodeB forwards a message sent by the UE to the MME.

Step 7: The HLR/HSS1 sends a Notification Request message to the SM, where the message may include one or more pieces of information, such as the current location information (such as a cell identity cell id or a location area identity RA/LA/TA) of the UE, the PLMN ID of the available cellular network around the UE, and the AP ID or the SSID of the available wireless local area network around the UE.

Step 8: The SM sends an activate profile request (Activate Profile Request) message to an HLR/HSS2 of a second mobile network MN2, where the message includes an identity of the UE, such as an IMSI of the UE or an identity that is allocated by the SM to the UE; and the HLR/HSS2 sends an Activate Profile Response message to the SM, where the message may include mobile network information (subscription profile) provided by the MN2 for the UE, which may also be referred to as subscription information or the like. Activation of subscription data, on the MN2, of the UE is implemented in the process. If the subscription data of the UE has been activated on the MN2, this step does not need to be performed.

Step 9: The SM sends a Notification Response message to the HLR/HSS1, where the message includes the mobile network information Subscription profile, on the MN2, of the UE. When the mobile network information of the MN2 has been preconfigured on the UE, the foregoing information does not need to be included, and in this case, the SM adds the MN Switch indication into the message, so as to instruct the UE to activate the mobile network information of the MN2 and to switch to the second mobile network (MN2). The Notification Response message may also include a "network switch complete" indication, where the HLR/HSS deletes, according to the "network switch complete" indication, the previously recorded "network switch" indication of the UE, or sets the "network switch" indication to "completed".

Step 10: The HLR/HSS1 sends an Update Location Ack message to the MME, where the message includes the mobile network information Subscription profile, on the MN2, of the UE or the MN Switch indication, so as to instruct the UE to activate the mobile network information of the MN2 and switch to the MN2.

Step 11: The MME sends an Attach Accept message to the UE, where the message includes the mobile network information Subscription profile, on the MN2, of the UE or the MN Switch indication, so as to instruct the UE to activate the mobile network information of the MN2 and switch to the MN2.

Step 12: After receiving indication information of the MN2, the UE sends an Attach Complete message to the MME.

Step 13: The UE implements switching to a new MN according to the received network switch indication information (the mobile network information Subscription profile of the MN2 and/or the MN Switch indication) of switching to the MN2. For example, the UE detaches from the MN1, activates the mobile network information of the MN2 on the UE, and performs processing of attachment to the MN2; or when the UE is in a roaming state, the UE selects a visited network that is in a roaming area and that has a roaming protocol with the MN2, so as to implement attachment.

The MME in this embodiment is a mobility management entity device on an LTE network. This embodiment is also applicable to another mobile network, including a serving GPRS support node SGSN, a mobile switching center/visitor location register MSC/VLR, and the like on a 2G/3G network. Correspondingly, the eNodeB eNodeB in the flowchart may be a base station controller BSC or a radio network controller RNC.

Embodiment 5

Figure 7:
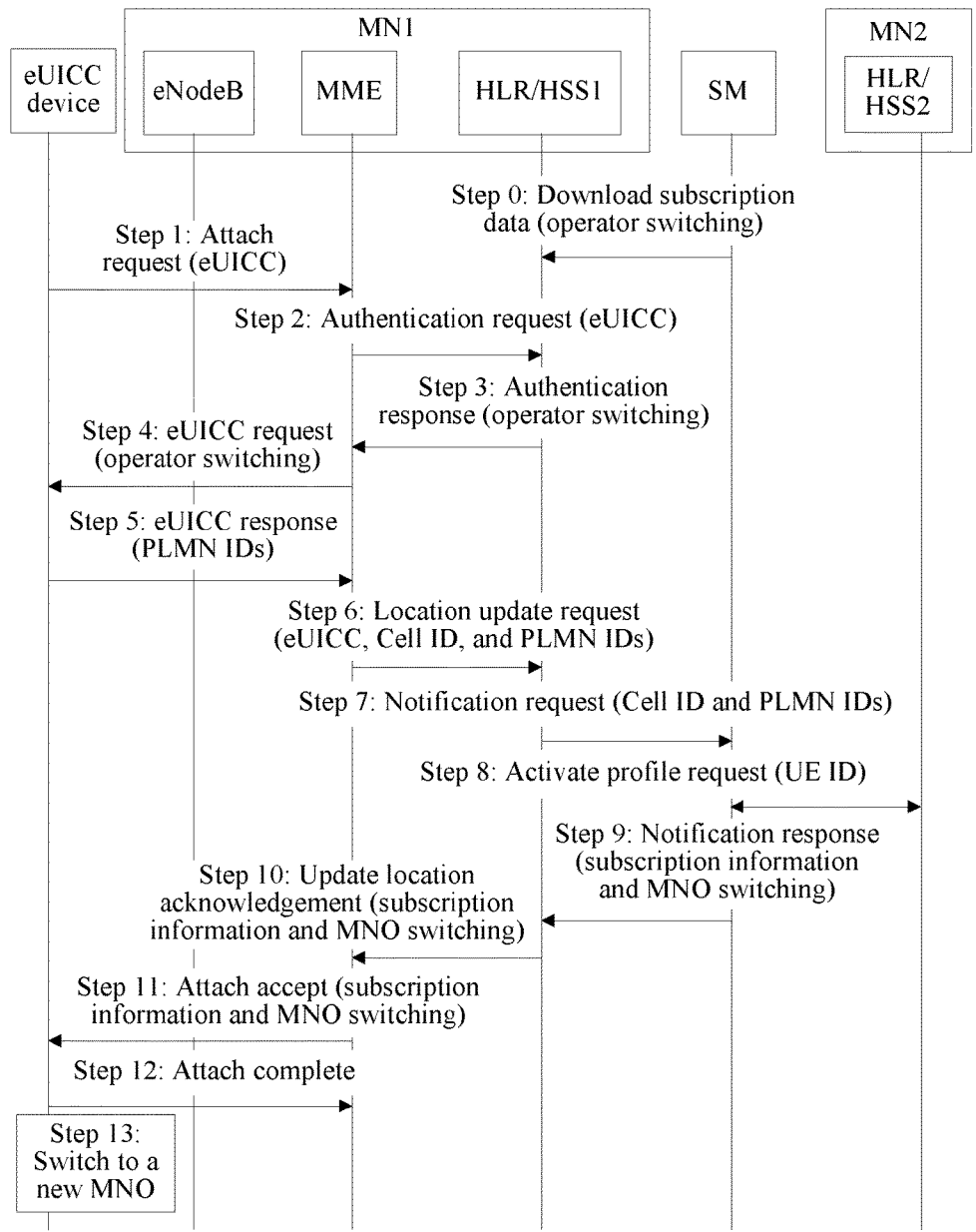
FIG. 7 is a schematic signaling diagram of still another embodiment of a method for dynamically switching a mobile network according to the present invention.

FIG. 7 is a schematic signaling diagram of still another embodiment of a congestion control method according to the present invention, and the method includes:

Step 0: Same as step 0 in Embodiment 4.

When the UE does not attach to the first mobile network (for example, information about an MME to which the UE currently attaches is not recorded in the HLR/HSS, or the information about the MME is invalid), the first mobile network does not execute a subsequent process until the UE initiates step 1.

When the UE has attached to the first mobile network (for example, valid information of an MME to which the UE currently attaches is recorded in the HLR/HSS), the method further includes step 0a: the HLR/HSS sends a subscription data update request message (Subscription Update Request, that is, mobile network switch message) to the MME, where the message includes the "network switch (MN Switch)" indication. When the UE has attached to the MME, the MME performs step 4. The method further includes step 0b: the MME sends a subscription data update acknowledgement message (Subscription Update Ack) to the HLR/HSS. There is no time sequence relationship between step 4 and step 0b.

Step 1: The UE sends an Attach Request message to an MME, where the message includes an eUICC indication that indicates that the UE has an eUICC capability.

Step 2: The MME sends an Authentication Request message to the HLR/HSS1, where the message may carry the eUICC capability indication of the UE.

Step 3: The HLR/HSS1 sends an Authentication Response message to the MME, where the message includes the "network switch (MN Switch)" indication.

Step 4: The MME sends an eUICC Request message to the UE, where the message may include an "available mobile network nearby" indication, so as to request the UE to provide a PLMN ID of an available cellular network around a location of the UE and/or an AP ID or an SSID of an available wireless local area network around the UE.

Step 5: The UE sends an eUICC Response message to the MME, where the message includes at least one of PLMN ID information, AP ID information, and SSID information, where the PLMN ID information is used to indicate the PLMN ID of the available cellular network around the location of the UE, and the AP ID information or the SSID information indicates the AP ID or the SSID of the available wireless local area network around the location of the UE.

Step 6 to step 13 are the same as step 6 to step 13 in Embodiment 4, and details are not described herein again.

The MME in this embodiment is a mobility management entity device on an LTE network. This embodiment is also applicable to another mobile network, including an SGSN, an MSC/a VLR, and the like on a 2G/3G network. Correspondingly, the eNodeB in the flowchart may be a BSC or an RNC.

Embodiment 6

Figure 8:
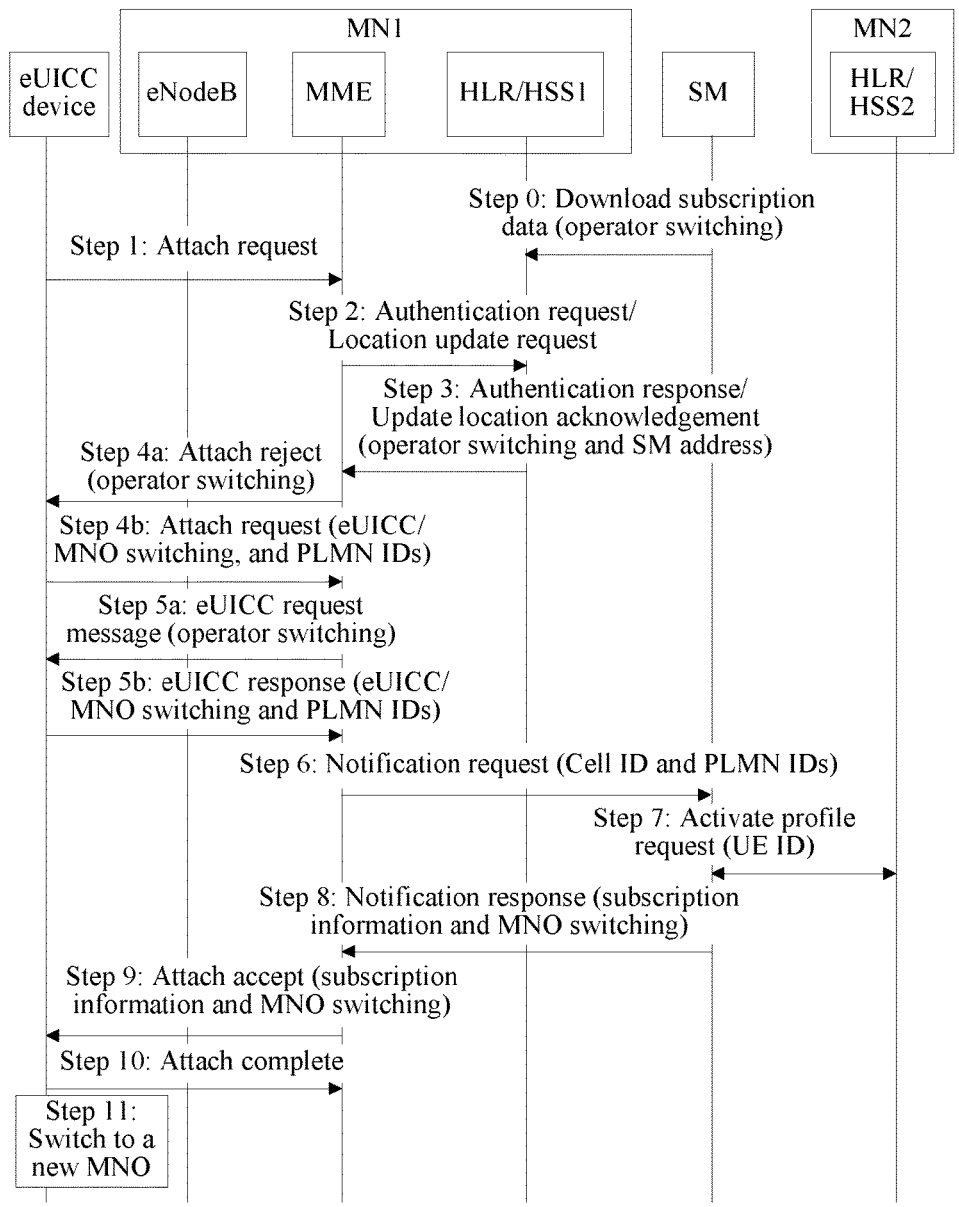
FIG. 8 is a schematic signaling diagram of still another embodiment of a method for dynamically switching a mobile network according to the present invention.

FIG. 8 is a schematic signaling diagram of still another embodiment of a congestion control method according to the present invention, and the method includes:

Step 0 to step 2: Same as step 0 to step 2 in Embodiment 4.

Step 3: The HLR/HSS1 may add, according to the MN Switch indication received in step 0, address information of the SM into an authentication response (Authentication Response) message or an update location acknowledgement (Update Location Ack) message that is sent to the MME. In a case in which an address of the SM is provided, the MN Switch indication is optional. The address of the SM may be provided by the SM for the HLR/HSS1 in step 0, or may be preconfigured in the HLR/HSS1.

Step 4 and step 5: Same as step 4 and step 5 in Embodiment 4.

Step 6: The MME sends a Notification Request message to the SM, where the message may include one or more pieces of information, such as current location information (such as a cell identity cell id or a location area identity RA/LA/TA) of the UE, the PLMN ID of the available cellular network around the UE, and the AP ID/SSID of the available wireless local area network around the UE.

Step 7: Same as step 8 in Embodiment 4.

Step 8: The SM sends a Notification Response message to the MME, where the message includes the mobile network information Subscription profile, on the MN2, of the UE. When the mobile network information of the MN2 has been preconfigured on the UE, the foregoing information does not need to be included, and in this case, the SM adds the MN Switch indication into the message, so as to instruct the UE to activate the mobile network information of the MN2 and switch to the MN2.

Step 8a: The SM sends a subscription data update to the HLR/HSS, where the subscription data update message includes a "network switch complete" indication, where the HLR/HSS deletes, according to the "network switch complete" indication, the previously recorded "network switch" indication of the UE, or sets the "network switch" indication to "completed".

Step 9 to step 11: Same as step 11 to step 13 in Embodiment 4.

The MME in this embodiment is a mobility management entity device on an LTE network. This embodiment is also applicable to another mobile network, including an SGSN, an MSC/a VLR, and the like on a 2G/3G network. Correspondingly, the eNodeB in the flowchart may be a BSC or an RNC.

Embodiment 7

Figure 9:
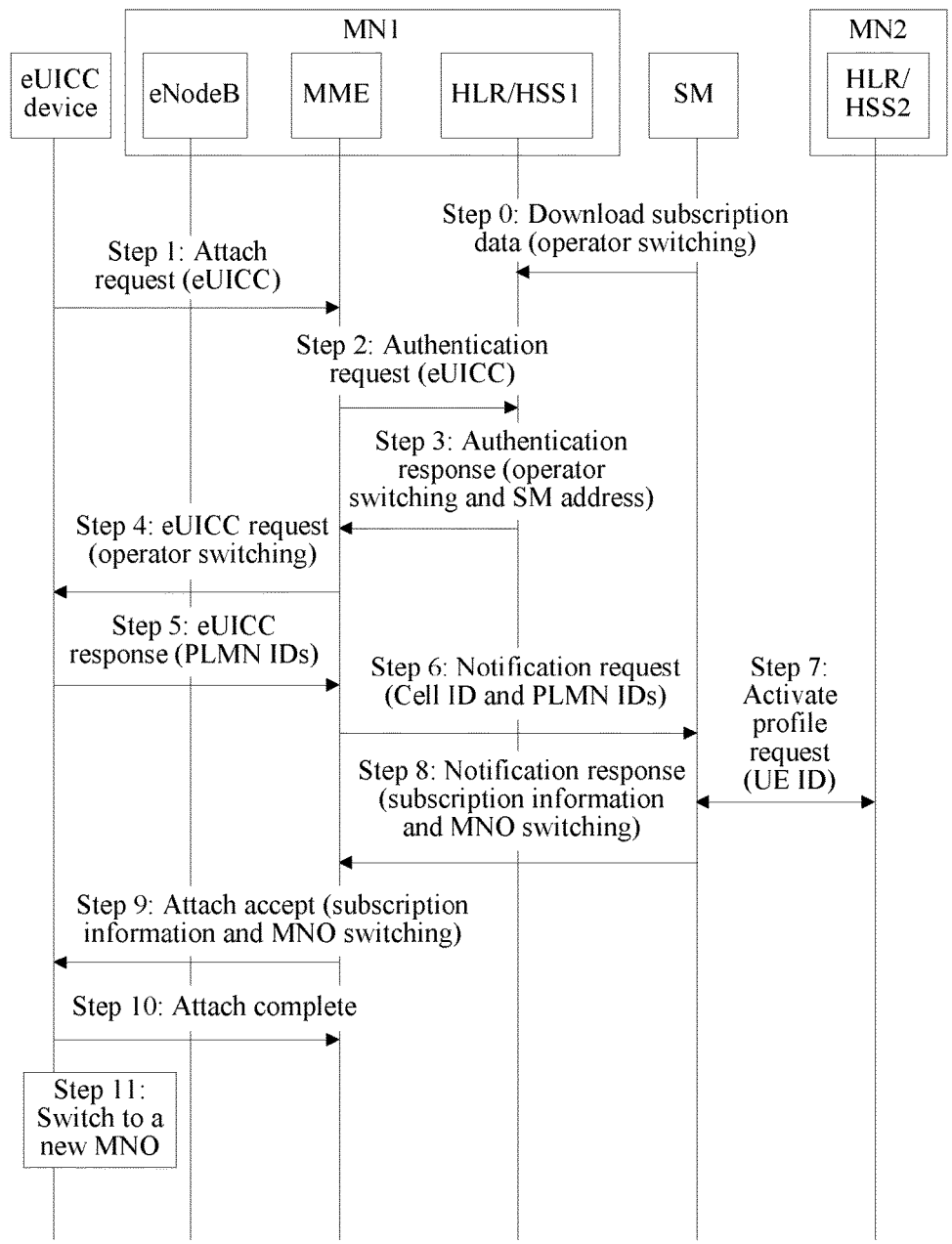
FIG. 9 is a schematic signaling diagram of still another embodiment of a method for dynamically switching a mobile network according to the present invention.

FIG. 9 is a schematic signaling diagram of still another embodiment of a congestion control method according to the present invention. A difference between this embodiment and Embodiment 5 mainly lies in that: an SM directly receives a Notification Request message from an MME, so as to initiate MN switching, that is, step 6 and step 8. A process of the method for dynamically switching a mobile network in this embodiment includes:

Step 0 to step 2: Same as step 0 to step 2 in Embodiment 5.

Step 3: The HLR/HSS1 may add, according to the MN Switch indication received in step 0 and/or the eUICC indication received in step 2, address information of the SM into an authentication response (Authentication Response) message to be sent to the MME. In a case in which an address of the SM is provided, the MN Switch indication is optional. The address of the SM may be provided by the SM for the HLR/HSS1 in step 0, or may be preconfigured in the HLR/HSS1.

Step 4 and step 5: Same as step 4 and step 5 in Embodiment 5.

Step 6: The MME sends a Notification Request message to the SM, where the message may include one or more pieces of information, such as current location information (such as a cell identity cell id or a location area identity RA/LA/TA) of the UE, the PLMN ID of the available cellular network around the UE, and the AP ID or the SSID of the available wireless local area network around the location of the UE.

Step 7: Same as step 8 in Embodiment 5.

Step 8: The SM sends a Notification Response message to the MME, where the message includes the mobile network information Subscription profile, on the MN2, of the UE. When the mobile network information of the MN2 has been preconfigured on the UE, the foregoing information does not need to be included, and in this case, the SM adds the MN Switch indication into the message, so as to instruct the UE to activate the mobile network information of the MN2 and switch to the MN2.

Step 8a: The SM sends a subscription data update to the HLR/HSS, where the subscription data update message includes a "network switch complete" indication, where the HLR/HSS deletes, according to the "network switch complete" indication, the previously recorded "network switch" indication of the UE, or sets the "network switch" indication to "completed".

Step 9 to step 11: Same as step 11 to step 13 in Embodiment 5.

The MME in this embodiment is a mobility management entity device on an LTE network. This embodiment is also applicable to another mobile network, including an SGSN, an MSC/a VLR, and the like on a 2G/3G network. Correspondingly, the eNodeB in the flowchart may be a BSC or an RNC.

Embodiment 8

Figure 10:
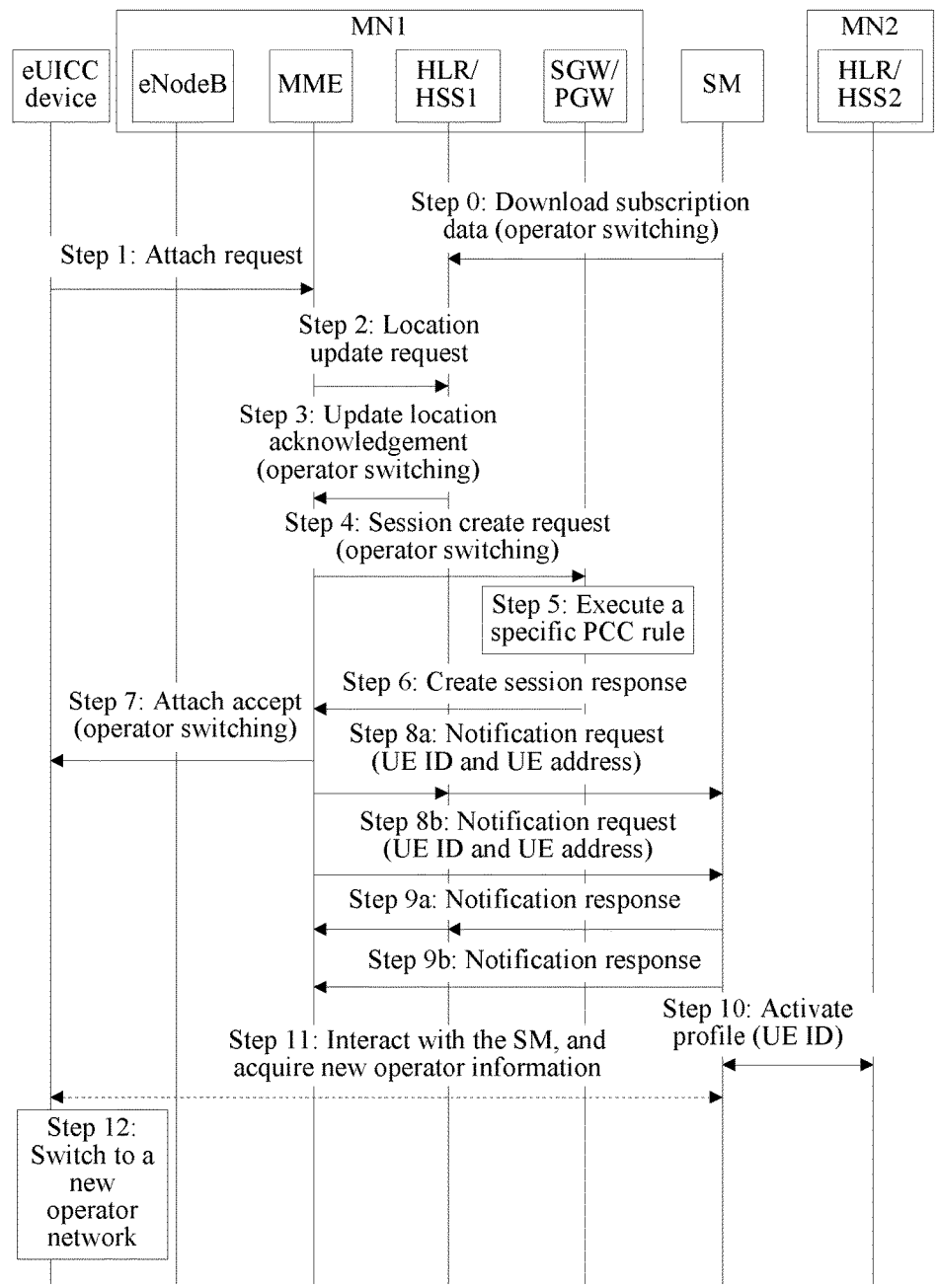
FIG. 10 is a schematic signaling diagram of still another embodiment of a method for dynamically switching a mobile network according to the present invention.

FIG. 10 is a schematic signaling diagram of still another embodiment of a congestion control method according to the present invention, and the method includes:

Step 0: An SM sends a subscription data update to a subscription data server HLR/HSS1 (the HLR is a home location register, and the HSS is a home subscriber server, both of which are used to store subscription data, and either the HLR or the HSS may be selected herein) of an MN1, so as to modify subscription information of a UE to "network switch (MN Switch)". The UE may be all UEs of the service provider, or may be some UEs or a particular UE that do or does not successfully implement mobile network switching.

When the UE does not attach to the first mobile network (for example, information about an MME to which the UE currently attaches is not recorded in the HLR/HSS, or the information about the MME is invalid), the first mobile network does not execute a subsequent process until the UE initiates step 1.

When the UE has attached to the first mobile network (for example, valid information of an MME to which the UE currently attaches is recorded in the HLR/HSS), the method further includes step 0a: the HLR/HSS sends a subscription data update request message (Subscription Update Request) to the MME, where the message includes the "network switch (MN Switch)" indication. When the UE has attached to the MME, the MME performs step 4. The method further includes step 0b: the MME sends a subscription data update acknowledgement message (Subscription Update Ack) to the HLR/HSS. There is no time sequence relationship between step 4 and step 0b.

Step 1: A UE in which an eUICC is installed sends an Attach Request message to an MME. The MME may be a device on the mobile network MN1 with which the UE originally performs subscription, or in a roaming case, the MME may be a device on a visited network having a roaming protocol with the MN1.

Step 2: The MME sends a location update request (Update Location Request) message to the HLR/HSS1.

Step 3: The HLR/HSS1 sends an update location acknowledgement (Update Location Ack) message to the MME according to the MN Switch received by the HLR/HSS1 in step 0, where the acknowledgement message includes the "network switch (MN Switch)" indication.

Step 4: The MME sends a create session request (Create Session Request) message to gateway devices SGW and PGW (the MME sends a create session request message to the SGW, and the SGW sends the create session request message to the PGW), where the message includes the "network switch (MN Switch)" indication;

or when the MME receives the "network switch" indication sent by the HLR/HSS in step 0a and a session of the UE has been established, the MME sends a update bearer request (Update Bearer Request) to gateway devices SGW and PGW, where the message includes the "network switch (MN Switch)" indication.

Step 5: The PGW establishes or updates a bearer, and executes a specific Policy and Charging Control PCC rule according to the received "network switch (MN Switch)" indication. For example, a packet filtering rule (Packet Filter) is modified so that only a packet related to network switching is allowed to be transmitted, or only a packet sent to the SM or received from the SM is allowed. The PCC rule may be preconfigured on the PGW, or may be acquired from a policy and charging rules function device PCRF (Policy and Charging Rules Function), that is, after receiving the create session request message, the PGW sends a message to the PCRF, where the message include the "network switch (MN Switch)" indication, and the PCRF sends the specific PCC rule to the PGW according to the "network switch (MN Switch)" indication.

Step 6: The PGW sends a create session response (Create Session Response) message or a update bearer response message (Update Bearer Response) to the SGW and the MME.

Step 7: The MME sends an attach accept (Attach Accept) message to the UE, where the message may include the optional "network switch (MN Switch)" indication.

Steps 8a, 8b, 9a, and 9b are optional, and particularly, when the MME provides the "network switch (MN Switch)" indication for the UE in step 7, steps 8a to 9b may be not performed.

Step 8a: When the SM communicates with the MME by using the HLR/HSS1, the MME sends a notification request (Notification Request) message to the HLR/HSS1, and the HLR/HSS1 sends the notification request (Notification Request) message to the SM, where the notification request message includes a UE ID, such as an IMSI of the UE, an IP address of the UE, or an identity that is allocated by the SM to the UE.

Step 8b: When the SM directly communicates with the MME, the MME sends a notification request (Notification Request) message to the SM, where the notification request message includes a UE ID, such as an IMSI of the UE, an IP address of the UE, or an identity that is allocated by the SM to the UE. An address of the SM may be preconfigured in the MME, or may be provided by the HLR/HSS1 in step 3.

Step 9a: In response to step 8a, the SM sends a notification response (Notification Response) message to the HLR/HSS1, and the HLR/HSS1 sends the notification response (Notification Response) message to the MME. The Notification Response message may also include a "network switch complete" indication, where the HLR/HSS deletes, according to the "network switch complete" indication, the previously recorded "network switch" indication of the UE, or sets the "network switch" indication to "completed".

Step 9b: In response to step 8b, the SM sends a notification response (Notification Response) message to the MME. In this case, the method includes step 9c: the SM sends a subscription data update to the HLR/HSS, where the subscription data update message includes a "network switch complete" indication, where the HLR/HSS deletes, according to the "network switch complete" indication, the previously recorded "network switch" indication of the UE, or sets the "network switch" indication to "completed".

Step 10: The SM may send an Activate Profile Request message to an HLR/HSS2 of an MN2 according to the notification request received in step 8a or step 8b, or according to a request packet that is sent by the UE and received in step 11 (pull mode), where the message includes the identity of the UE, such as the IMSI of the UE or the identity that is allocated by the SM to the UE; and the HLR/HSS2 sends an Activate Profile Response message to the SM. Activation of subscription data, on the MN2, of the UE is implemented in the process. If the subscription data of the UE has been activated on the MN2, this step does not need to be performed.

Step 11: The UE performs data exchange with the SM through a data connection channel established on the MN1, so as to enable the UE to acquire updated mobile network information of the MN2. Specific processing includes two situations:

Manner 1: The SM sends the updated mobile network information of the MN2 to the UE according to the notification request message received in step 8a or 8b. This manner may be generally referred to as a Push manner.

Manner 2: The UE sends a network switch request to the SM according to the "network switch (MN Switch)" indication received in step 7, and the SM sends the updated mobile network information of the MN2 to the UE. This manner may be generally referred to as a Pull manner.

Step 12: The UE implements switching to a new MN according to the received indication information of switching to an MNO. For example, the UE detaches from the MN1, activates the mobile network information of the MN2 on the UE, and performs processing of attachment to the MN2; or when the UE is in a roaming state, the UE selects a visited network that is in a roaming area and that has a roaming protocol with the MN2, so as to implement attachment.

Embodiment 9

Figure 11:
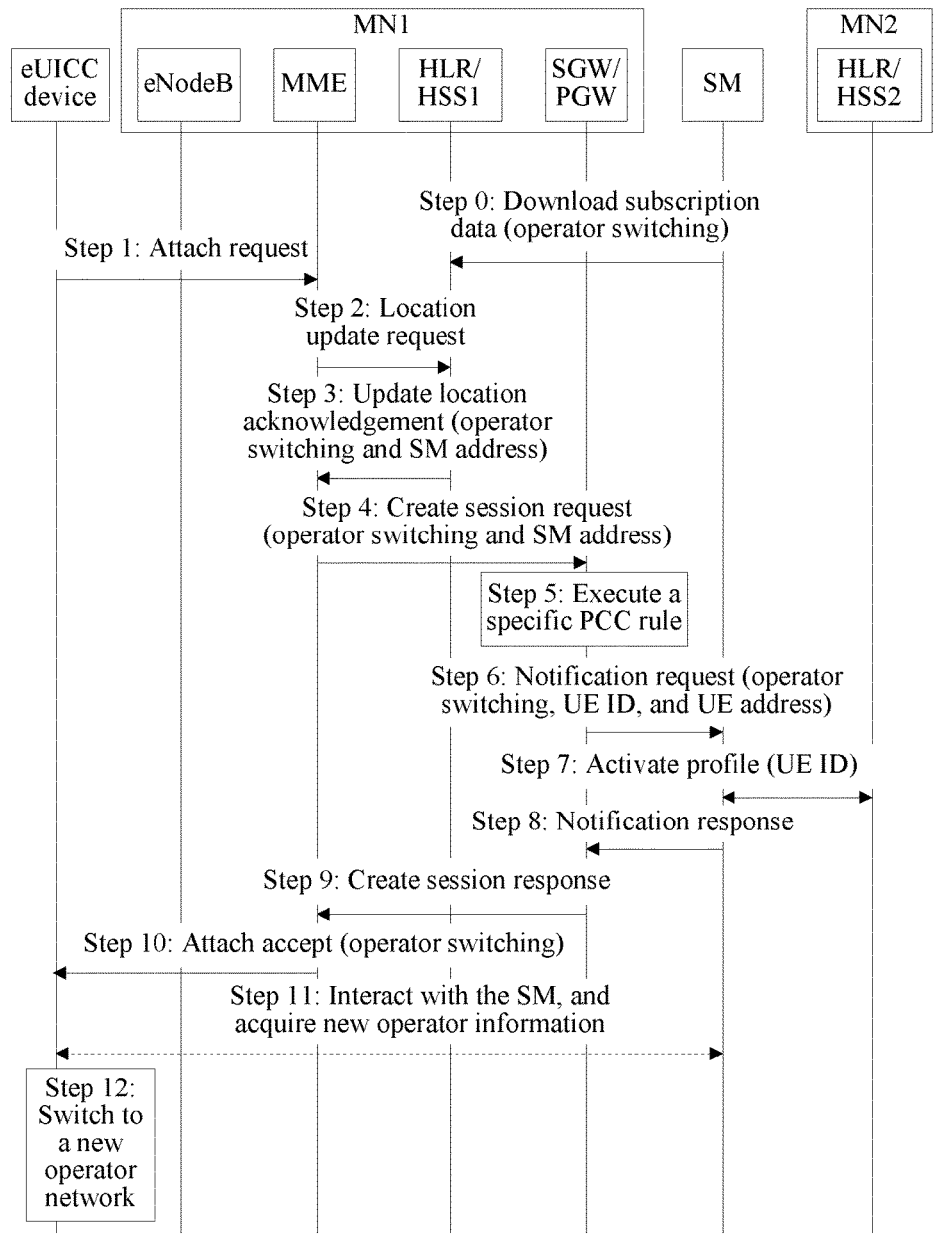
FIG. 11 is a schematic signaling diagram of still another embodiment of a method for dynamically switching a mobile network according to the present invention.

FIG. 11 is a schematic signaling diagram of still another embodiment of a congestion control method according to the present invention, and the method includes:

Step 0 to step 2: Same as step 0 to step 2 in Embodiment 8.

Step 3: The HLR/HSS1 sends an update location acknowledgement (Update Location Ack) message to the MME according to the MN Switch received by the HLR/HSS1 in step 0, where the acknowledgement message includes the "network switch (MN Switch)" indication. The message may further include address information of the SM (SM Address).

Step 4: The MME sends a create session request (Create Session Request) message to gateway devices SGW and PGW (the MME sends a create session request message to the SGW, and the SGW sends the create session request message to the PGW), where the message includes the "network switch (MN Switch)" indication and/or the address information of the SM, and the address information of the SM may be provided by the HLR/HSS1 in step 3, or may be preconfigured in the MME;

or when the MME receives the "network switch" indication sent by the HLR/HSS in step 0a and a session of the UE has been established, the MME sends a update bearer request (Update Bearer Request) to gateway devices SGW and PGW, where the message includes the "network switch (MN Switch)" indication.

Step 5: Same as step 5 in Embodiment 8.

Step 6: The PGW sends a notification request (Notification Request) message to the SM according to the received "network switch (MNO Switch)" indication, where the message includes the optional "network switch (MN Switch)" indication, an identity (an IP address of the UE or an identity that is allocated by the SM to the UE) of the UE, and the like. The address information of the SM in the step may be the address information of the SM received by the PGW in step 4, or may be preconfigured in the PGW.

Step 7: The SM may send an Activate Profile Request message to an HLR/HSS2 of an MN2 according to the notification request received in step 6, or according to a request packet that is sent by the UE and received in step 11 (pull mode), where the message includes the identity of the UE, such as the IMSI of the UE or the identity that is allocated by the SM to the UE; and the HLR/HSS2 sends an Activate Profile Response message to the SM. Activation of subscription data, on the MN2, of the UE is implemented in the process. If the subscription data of the UE has been activated on the MN2, this step does not need to be performed.

The SM sends a subscription data update to the HLR/HSS, where the subscription data update message includes a "network switch complete" indication, where the HLR/HSS deletes, according to the "network switch complete" indication, the previously recorded "network switch" indication of the UE, or sets the "network switch complete" indication to "completed".

Step 8: The SM sends a notification response (Notification Response) message to the PGW.

Step 9: Same as step 6 in Embodiment 8.

The foregoing step 6 to step 8 do not have a time sequence relationship with step 5 and step 9, and may be performed according to the current sequence of numbers, or the foregoing step 6 to step 8 may be performed before step 5, or performed after step 9.

Step 10: The MME sends an attach accept (Attach Accept) message to the UE, where the message may include the optional "network switch (MN Switch)" indication.

Step 11: The UE performs data exchange with the SM through a data connection channel established on the MN1, so as to enable the UE to acquire updated mobile network information of the MN2. Specific processing includes two situations:

Manner 1: The SM sends the updated mobile network information of the MN2 to the UE according to the notification request message received in step 6. This manner may be generally referred to as a Push manner.

Manner 2: The UE sends a mobile network switch request to the SM according to the "network switch (MN Switch)" indication received in step 10, and the SM sends the updated mobile network information of the MN2 to the UE. This manner may be generally referred to as a Pull manner.

Step 12: The UE implements switching to a new MN according to the received indication information of switching to the MN2. For example, the UE detaches from the MN1, activates the mobile network information of the MN2 on the UE, and performs processing of attachment to the MN2; or when the UE is in a roaming state, the UE selects a visited network that is in a roaming area and that has a roaming protocol with the MN2, so as to implement attachment.

Embodiment 10

Figure 12:
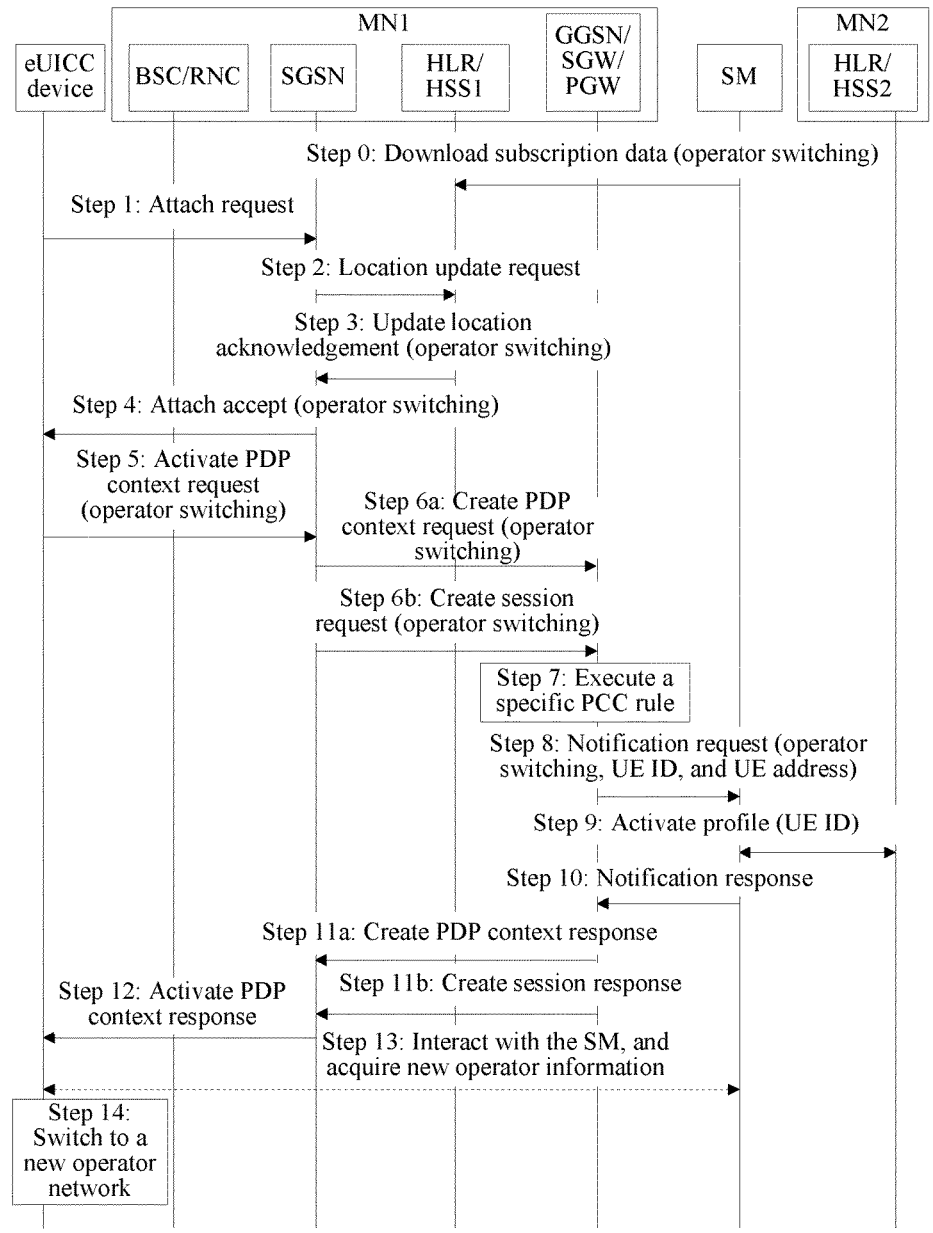
FIG. 12 is a schematic signaling diagram of still another embodiment of a method for dynamically switching a mobile network according to the present invention.

FIG. 12 is a schematic signaling diagram of still another embodiment of a congestion control method according to the present invention, and the method includes:

Step 0: An SM sends a subscription data update to a subscription data server HLR/HSS1 (the HLR is a home location register, and the HSS is a home subscriber server, both of which are used to store subscription data, and either the HLR or the HSS may be selected herein) of an MN1, so as to modify subscription information of a UE to "network switch (MN Switch)". The UE may be all UEs of the service provider, or may be some UEs or a particular UE that do or does not successfully implement mobile network switching.

Step 1: A UE in which an eUICC is installed sends an Attach Request message to an SGSN. The SGSN may be a device on the mobile network MN1 network with which the UE originally performs subscription, or in a roaming case, the SGSN may be a device on a visited network having a roaming protocol with the MN1.

Step 2: The SGSN sends a location update request (Update Location Request) message to the HLR/HSS1.

Step 3: The HLR/HSS1 sends an update location acknowledgement (Update Location Ack) message to the SGSN according to the MN Switch received by the HLR/HSS1 in step 0, where the acknowledgement message includes the "network switch (MN Switch)" indication.

Step 4: The SGSN sends an attach accept (Attach Accept) message to the UE, where the message includes the "network switch (MN Switch)" indication.

Step 5: The UE sends an activate Packet Data Protocol (Packet Data Protocol, PDP) context request (Activate PDP Context Request) message to the SGSN according to the received "network switch (MN Switch)" indication, where the message includes the "network switch (MN Switch)" indication.

The SGSN performs step 6a or step 6b. When a gateway device connected to the SGSN is a GGSN (for example, the SGSN is a Gn/Gp SGSN), step 6a is performed; when gateway devices connected to the SGSN are an SGW and a PGW (for example, the SGSN is an S4 SGSN), step 6b is performed.

Step 6a: The SGSN sends a create PDP context request (Create PDP Context Request) message to a GGSN according to the "network switch (MN Switch)" indication received in step 5 or the "network switch (MN Switch)" indication received in step 3, where the message includes the "network switch (MN Switch)" indication.

Step 6b: The SGSN a create session request (Create Session Request) message to gateway devices SGW and PGW according to the "network switch (MN Switch)" indication received in step 5 or the "network switch (MN Switch)" indication received in step 3 (the SGSN sends the create session request message to the SGW, and the SGW sends the create session request message to the PGW), where the message includes the "network switch (MN Switch)" indication.

Step 7 to step 10: Same as step 5 to step 8 in Embodiment 6. Processing of the PGW in Embodiment 6 is applicable to processing of the GGSN in this embodiment.

Step 11a: The GGSN sends a create PDP context response (Create PDP Context Response) message to the SGSN in response to step 6a.

Step 11b: The PGW sends a create session response (Create Session Response) message to the SGW and the MME in response to step 6b.

Step 12: The SGSN sends an activate PDP context response (Activate PDP Context Response) message to the UE.

Step 13 to step 14: Same as step 11 to step 12 in Embodiment 6.

Embodiment 11

Figure 13:
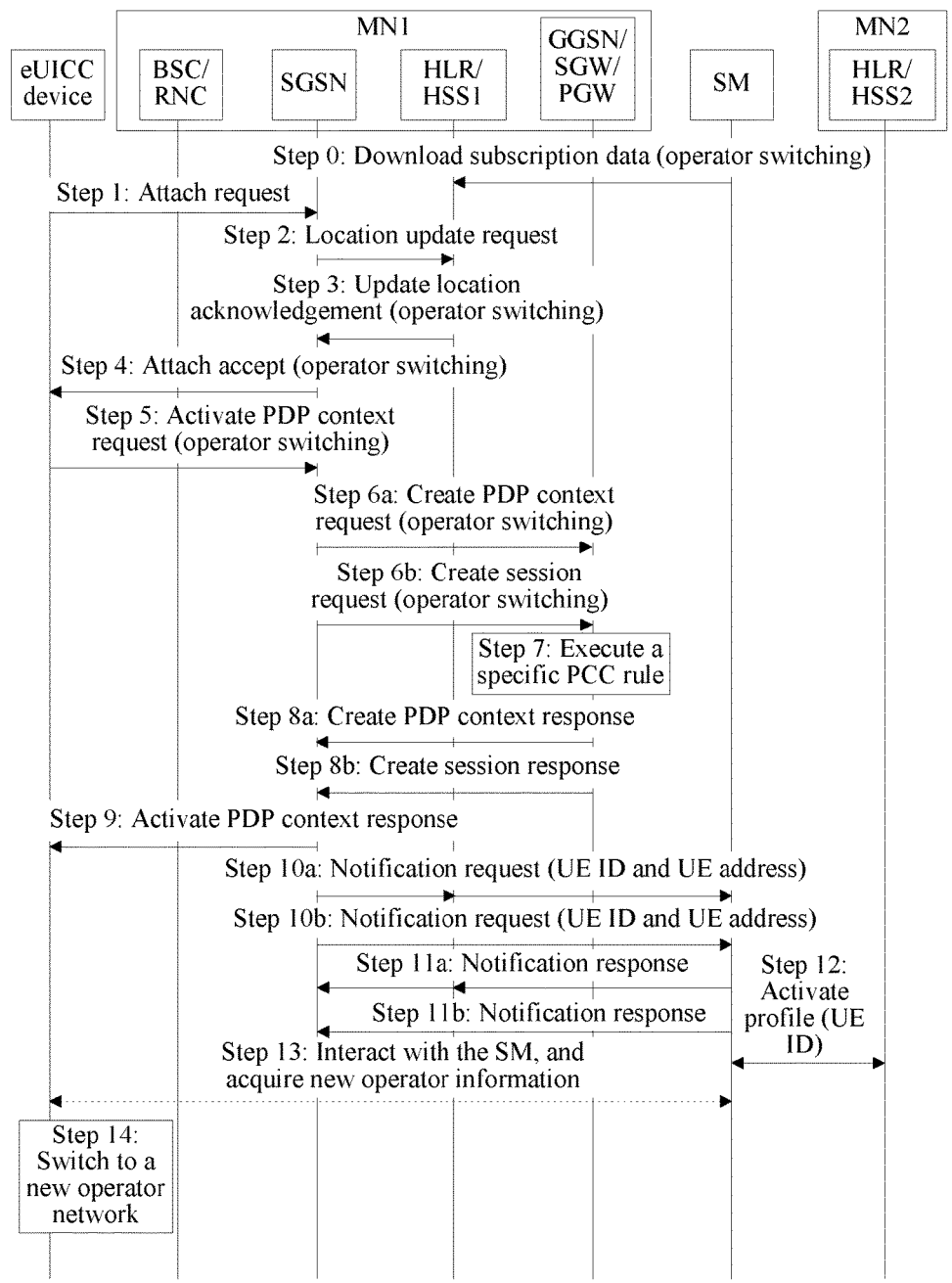
FIG. 13 is a schematic signaling diagram of still another embodiment of a method for dynamically switching a mobile network according to the present invention.

FIG. 13 is a schematic signaling diagram of still another embodiment of a congestion control method according to the present invention, and the method includes:

Step 0 to step 7: Same as step 0 to step 7 in Embodiment 10.

Step 8a, step 8b, and step 9 are the same as step 11a, step 11b, and step 12 in Embodiment 10.

Step 10a, step 10b, step 11a, step 11b, and step 12 to step 14 are the same as step 8a, step 8b, step 9a, step 9b, and step 10 to step 12 in Embodiment 8.

Embodiment 12

Figure 14:
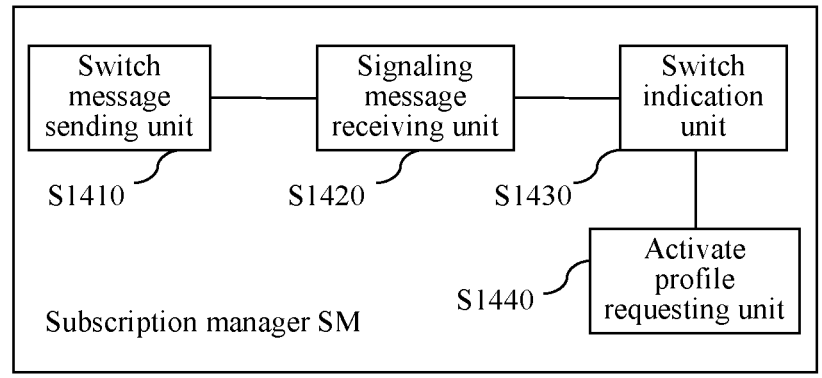
FIG. 14 is a schematic structural diagram of an embodiment of a subscription manager according to the present invention.

FIG. 14 is a schematic structural diagram of a subscription manager SM according to the present invention. The SM includes: a switch message sending unit 1410, a signaling message receiving unit 1420, and a switch indication unit 1430.

The switch message sending unit 1410 is configured to send a mobile network switch message to a first mobile network, where the mobile network switch message is used to indicate that user equipment UE needs network switching. The mobile network switch message may include information about the second mobile network. The information about the second mobile network includes at least one of a mobile network type, a mobile network identifier, and a mobile network index, where the mobile network index is used to indicate a mobile network type and/or a mobile network identifier that are/is stored on user equipment.

In this embodiment, the SM sends the mobile network switch message to the first mobile network through a pre-established data channel. The pre-established data channel may be a wired or wireless network that is established between the SM and an HSS or an HLR on the first mobile network. The mobile network switch message is used to instruct a UE of a service provider on the first mobile network to switch a mobile network, where the UE may be all UEs of the service provider, or may be only a UE that does not successfully implement operator switching. The mobile network switch message may further include address information of the SM, and subscription information, on the second mobile network, of the UE.

The signaling message receiving unit 1420 is configured to receive a notification signaling message from the first mobile network, where the notification signaling message is used to notify the SM that the UE intends to connect to the first mobile network.

After the first mobile network receives the mobile network switch message sent by the SM to the first mobile network, and when the UE attempts to attach to the first mobile network, the first mobile network sends the notification signaling message to the SM, so as to notify the SM that the UE intends to connect to the first mobile network. The notification signaling message includes at least one of the following items: location information of the UE, a PLMN ID (Public Land Mobile Network ID) of a network available to the UE, an AP ID (Access Point ID) of a wireless local area network available to the UE, and a service set identifier SSID (Service Set Identifier) of the wireless local area network available to the UE. The first mobile network may use the HSS or the HLR to send the notification signaling message to the SM; or in a case in which an address of the SM is known, may use an MME to directly send the notification signaling message to the SM; or may use an SGW or a PGW to send the notification signaling message to the SM.

When the first mobile network stops serving a service provider, and when a UE of the service provider initiates an attachment, the first mobile network sends an attach reject response that also carries the mobile network switch message. After receiving the response, the UE sends an attach request that includes an eUICC capability of the UE, a PLMN ID, and the mobile network switch message. The first mobile network sends the notification signaling message to the SM according to the attach request, so as to notify the SM that the UE intends to connect to the first mobile network.

The switch indication unit 1430 is configured to send the mobile network switch message to the UE by using the first mobile network, so as to instruct the UE to switch to the second mobile network.

If subscription data, on the second mobile network, of the UE has been activated on the second mobile network, after receiving the notification signaling message, the SM directly sends the mobile network switch message to the UE by using the first mobile network, so as to instruct the UE to switch to the second mobile network.

The SM further includes an activate profile requesting unit 1440. If subscription data, on the second mobile network, of the UE is not activated on the second mobile network in advance, before the SM sends the mobile network switch message to the UE, the activate profile requesting unit sends an activate profile request (which carries a UE ID, where the UE ID may be reported by the UE when the UE attaches to the first mobile network) to the second mobile network, where the activate profile request is used to request the second mobile network to activate the subscription data, on the second mobile network, of the UE.

After receiving the mobile network switch message (which may further include the subscription data, on the second mobile network, of the UE) that is sent by the SM to the UE, the first mobile network receives the attach request of the UE, and provides only an information exchange service related to network switching, so that the UE can be switched to the second mobile network by using the first mobile network.

The MME in this embodiment is a mobility management entity device on an LTE network. This embodiment is also applicable to another mobile network, including an SGSN, an MSC/a VLR, and the like on a 2G/3G network.

In this embodiment, an SM sends a mobile network switch message to a first mobile network and a corresponding UE, and the first mobile network provides the UE with only a corresponding service for performing mobile network switching, so that the UE can be successfully switched from the first mobile network to a second mobile network.

Embodiment 13

Figure 15:
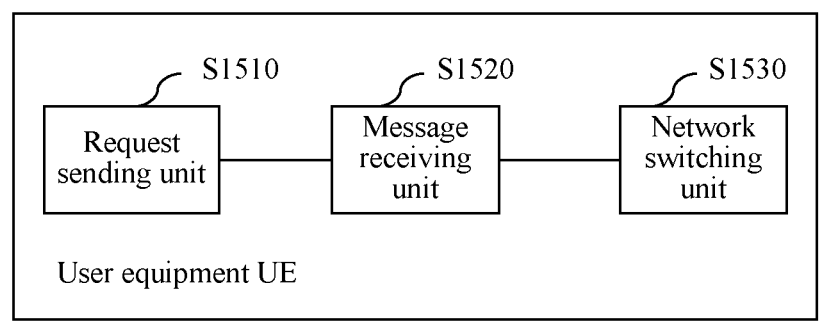
FIG. 15 is a schematic structural diagram of an embodiment of user equipment according to the present invention.

FIG. 15 is a schematic structural diagram of user equipment according to the present invention. The user equipment includes: a request sending unit 1510, a message receiving unit 1520, and a network switching unit 1530.

The request sending unit 1510 is configured to send a first-network connection request to a network device of a first mobile network, where the first-network connection request is an attach request.

The message receiving unit 1520 is configured to receive a first-network connection accept message from the network device of the first mobile network, where the first-network connection accept message includes a mobile network switch message that is used to instruct the UE to switch a mobile network, where the mobile network switch message comes from a subscription manager SM.

Optionally, in LTE, the network device is an MME, and the user equipment UE further includes:

a response message receiving unit, configured to receive a first-network connection response message of the network device of the first mobile network, where the first-network connection response message includes the mobile network switch message, and the mobile network switch message comes from the subscription manager SM; and a location information sending unit, configured to send a location response message to the network device of the first mobile network, where the location response message includes a PLMN ID of the UE. Because the first mobile network has stopped serving the UE of a corresponding service provider, and the first mobile network rejects the attach request sent by the requesting unit, the first-network connection response message is an attach reject. After receiving a reject response, the UE sends again an attach request, that is, the location response message, to the network device of the first mobile network, where the location response message may further include the mobile network switch message.

The first-network connection response message may further be an eUICC request message, and the location response message is an eUICC response message.

After receiving the location response message of the UE, the first mobile network notifies the SM that the UE intends to connect to the first mobile network, and then the SM sends the mobile network switch message to the UE by using the first mobile network, where the mobile network switch message may include subscription information, on the second mobile network, of the UE. The first mobile network sends the mobile network switch message to the UE in a manner of adding the mobile network switch message into the first-mobile-network connection accept message, where the first-network connection accept message is an attach accept, that is, accepting attachment of the UE, and the first mobile network provides the UE with only a corresponding service for mobile network switching.

The network switching unit 1530 is configured to connect to a second mobile network according to the mobile network switch message.

Optionally, in 2G or 3G, the network device is a serving GPRS support node device, that is, an SGSN.

The user equipment UE further includes: a context requesting unit, configured to send an activate PDP context request to the network device of the first mobile network, and receive an activate PDP context request response returned by the network device, where the activate PDP context request includes the mobile network switch message.

In this embodiment, when failing to connect to a first mobile network, user equipment may be further switched to a second mobile network according to network switch indication information returned by the first mobile network, thereby ensuring that a service of the user equipment is normal when the first mobile network stops service.

Embodiment 14

Figure 16:
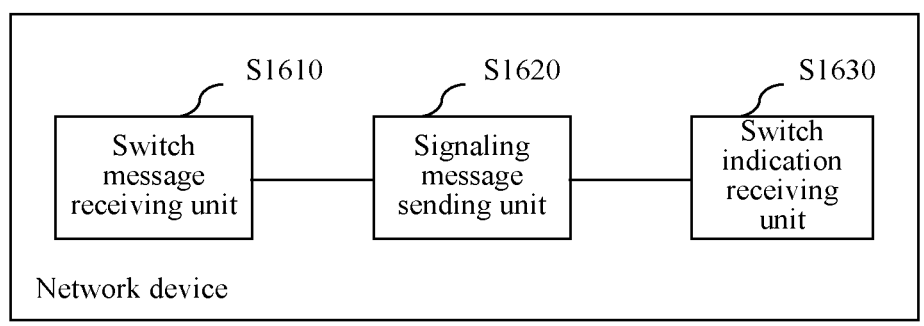
FIG. 16 is a schematic structural diagram of an embodiment of a network device according to the present invention.

FIG. 16 is a schematic structural diagram of a network device according to the present invention. The network device includes: a switch message receiving unit 1610, a signaling message sending unit 1620, and a switch indication receiving unit 1630.

The switch message receiving unit 1610 is configured to receive a mobile network switch message sent by a subscription manager SM, where the mobile network switch message is used to instruct user equipment UE to switch a mobile network. The mobile network switch message may include information about the second mobile network. The information about the second mobile network includes at least one of a mobile network type, a mobile network identifier, and a mobile network index, where the mobile network index is used to indicate a mobile network type and/or a mobile network identifier that are/is stored on user equipment.

The signaling message sending unit 1620 is configured to send, to the subscription manager SM, a notification signaling message that is used to notify the SM that the user equipment UE intends to connect to the first mobile network. The notification signaling message includes at least one of the following items:

location information of the UE, a PLMN ID of a network available to the UE, an AP ID of a wireless local area network available to the UE, and an SSID of the wireless local area network available to the UE.

The switch indication receiving unit 1630 is configured to receive the mobile network switch message from the SM, where the mobile network switch message is used to instruct the UE to connect to the second mobile network. If subscription data, on the second mobile network, of the UE is not activated on the second mobile network in advance, the mobile network switch message includes subscription information, on the second mobile network, of the UE.

Figure 17:
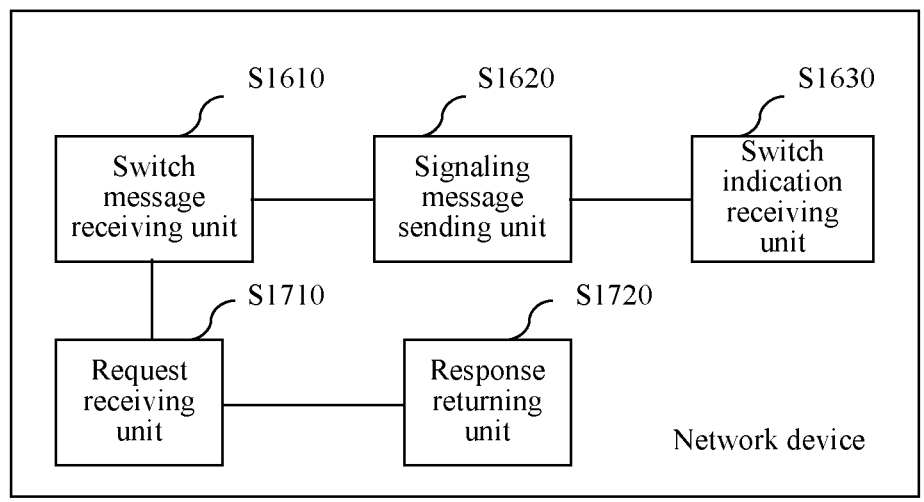
FIG. 17 is a schematic structural diagram of another embodiment of a network device according to the present invention.

The network device may be a home subscriber server HSS or a home location register HLR, where the HSS or the HLR receives the mobile network switch message from the SM. As shown in FIG. 17, on the basis of the structure shown in FIG. 16, the network device further includes a request receiving unit 1710 and a response returning unit 1720.

The request receiving unit 1710 is configured to receive an authentication request or a location update request that is sent by a mobility management entity MME. The response returning unit 1720 is configured to return an authentication response or a location update response to the MME, where the authentication response or the location update response includes the mobile network switch message. In addition, the notification signaling message may further be sent to the SM, so as to notify the SM that the UE intends to connect to the first mobile network.

Figure 18:
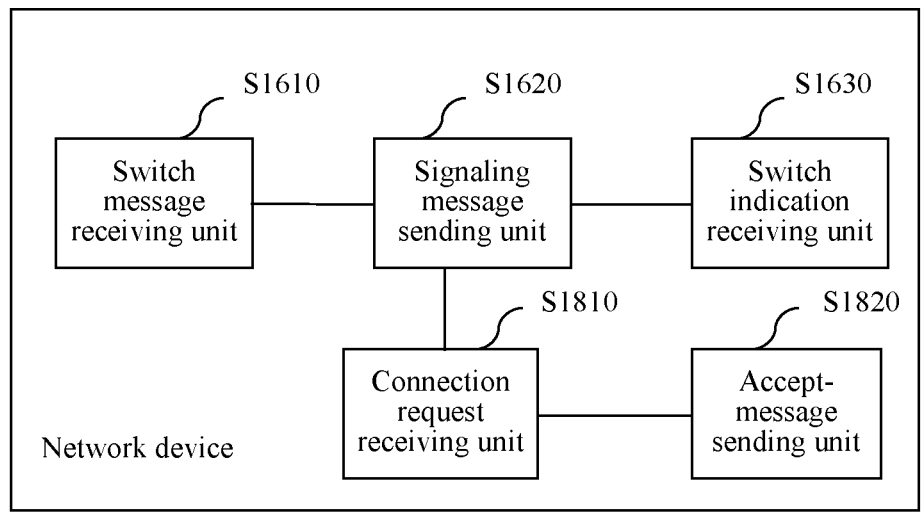
FIG. 18 is a schematic structural diagram of still another embodiment of a network device according to the present invention.

In this embodiment, for an LTE system, the network device may be a mobility management entity MME. As shown in FIG. 18, on the basis of the structure shown in FIG. 16, the network device further includes:

a connection request receiving unit 1810, configured to receive a first-network connection request from the UE, where the first-network connection request is an attach request; and an accept-message sending unit 1820, configured to send, to the UE, a first-network connection accept message that includes the mobile network switch message, where the first-network connection accept message is an attach accept.

Optionally, the network device further includes:

a request sending unit, configured to send an authentication request or a location update request to an HSS or an HLR after the first-network connection request is received;

a response receiving unit, configured to receive an authentication response or a location update response that is returned by the HSS or the HLR, where the authentication response or the location update response includes the mobile network switch message, and the mobile network switch message comes from the subscription manager SM;

a connection request responding unit, configured to return a first-network connection response message to the UE, where the first-network connection response message includes the mobile network switch message; and a location message receiving unit, configured to receive a location response message sent by the UE, where the location response message includes a PLMN ID of the UE.

After the MME receives the location response message sent by the UE, the MME sends the notification signaling message to the SM by using the HSS or the HLR, and receives, by using the HSS or the HLR, the mobile network switch message sent by the SM.

Optionally, the authentication response or the location update response further includes address information of the SM, and the MME directly sends the notification signaling message to the SM by using the address information, and directly receives, by using the address information, the mobile network switch message sent by the SM.

Optionally, the network device further includes:

a request sending unit, configured to send an authentication request or a location update request to an HSS or an HLR after the first-network connection request is received;

a response receiving unit, configured to receive an authentication response or a location update response that is returned by the HSS or the HLR, where the authentication response or the location update response includes the mobile network switch message;

a create session requesting unit, configured to send a create session request to an SGW or a PGW; and a create session response receiving unit, configured to receive a create session response returned by the SGW or the PGW.

Figure 19:
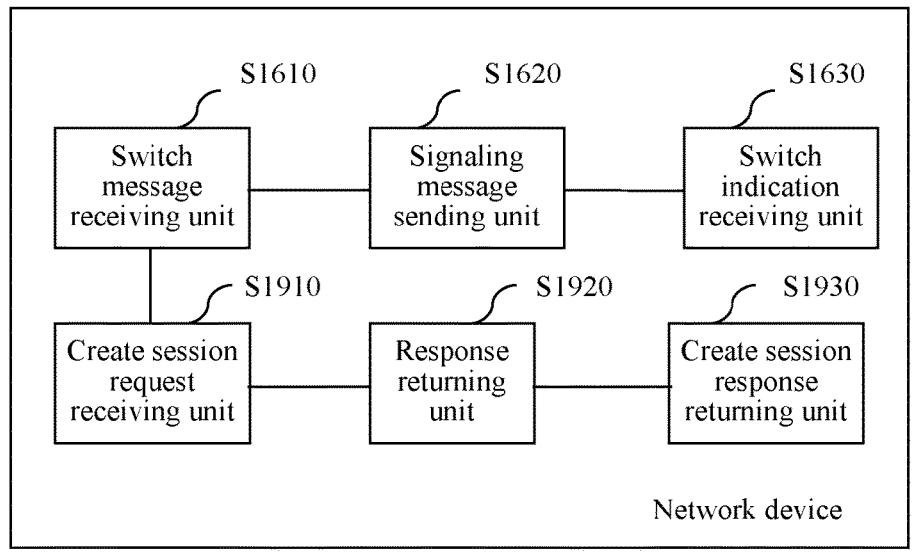
FIG. 19 is a schematic structural diagram of still another embodiment of a network device according to the present invention.

The network device may be a PGW or an SGW. As shown in FIG. 19, on the basis of the structure shown in FIG. 16, the network device further includes:

a create session request receiving unit 1910, configured to receive a create session request of an MME, where the create session request includes the mobile network switch message;

a PCC rule creating unit 1920, configured to create a specific PCC rule, where the specific PCC rule includes that only a packet for performing network switching is allowed to be transmitted, or that only a packet sent to the SM or received from the SM is allowed; and a create session response returning unit 1930, configured to return a create session response to the MME.

Figure 20:
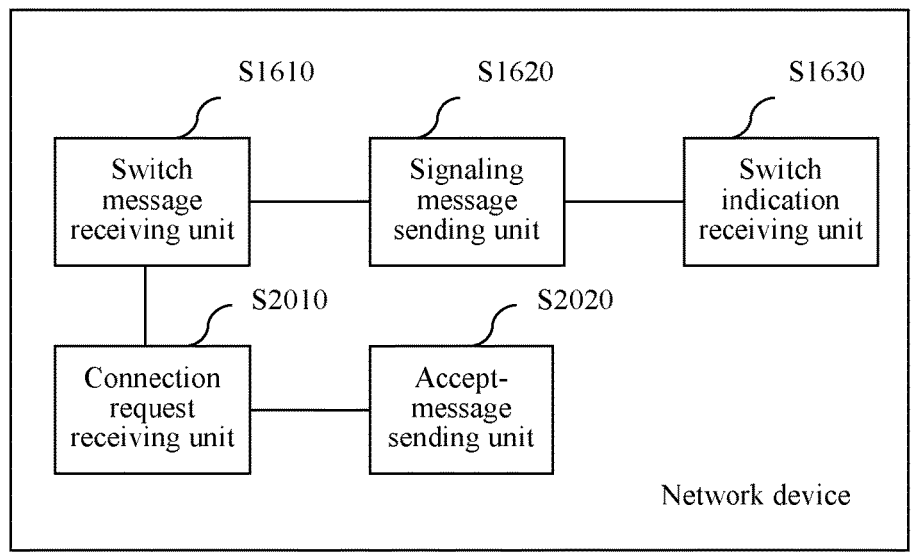
FIG. 20 is a schematic structural diagram of still another embodiment of a network device according to the present invention.

In this embodiment, for a 2G or a 3G system, the network device may be an SGSN. As shown in FIG. 20, on the basis of the structure shown in FIG. 16, the network device further includes:

a connection request receiving unit 2010, configured to receive a first-network connection request from the UE; and an accept-message sending unit 2020, configured to send, to the UE, a first-network connection accept message that includes the mobile network switch message. The first-network connection request is an attach request, and the first-network connection accept message is an attach accept.

Optionally, the network device further includes:

a request sending unit, configured to send an authentication request or a location update request to an HSS or an HLR after the first-network connection request is received; and a response receiving unit, configured to receive an authentication response or a location update response that is returned by the HSS or the HLR, where the authentication response or the location update response includes the mobile network switch message.

Optionally, after receiving the first-network connection accept message, the UE sends an activate PDP context request to the SGSN. The network device further includes:

a context request receiving unit, configured to receive the activate PDP context request sent by the UE, where the activate PDP context request includes the mobile network switch message; where the request sending unit is further configured to send a create PDP context request to a GGSN, an SGW, or a PGW, where the create PDP context request includes the mobile network switch message, or send a create session request to the GGSN, the SGW, or the PGW, where the create session request includes the mobile network switch message; and the response receiving unit is further configured to receive a create PDP context request response or a create session request response that is returned by the GGSN, the SGW, or the PGW; and a context request response returning unit, configured to return an activate PDP context request response to the UE.

A person of ordinary skill in the art may understand that, each aspect of the present invention or a possible implementation manner of each aspect may be specifically implemented as a system, a method, or a computer program product. Therefore, each aspect of the present invention or a possible implementation manner of each aspect may use forms of hardware only embodiments, software only embodiments (including firmware, resident software, and the like), or embodiments with a combination of software and hardware, which are uniformly referred to as "circuit", "module", or "system" herein. In addition, each aspect of the present invention or the possible implementation manner of each aspect may take a form of a computer program product, where the computer program product refers to computer-readable program code stored in a computer-readable medium.

The computer-readable medium may be a computer-readable signal medium or a computer-readable storage medium. The computer-readable storage medium includes but is not limited to an electronic, magnetic, optical, electromagnetic, infrared, or semi-conductive system, device, or apparatus, or any appropriate combination thereof, such as a random access memory (RAM), a read-only memory (ROM), an erasable programmable read only memory (EPROM or flash memory), an optical fiber, and a compact disc read only memory (CD-ROM).

A processor in a computer reads computer-readable program code stored in a computer-readable medium, so that the processor can perform a function and an action specified in each step or a combination of steps in a flowchart; an apparatus is generated to implement a function and an action specified in each block or a combination of blocks in a block diagram.

All computer-readable program code may be executed on a user computer, or some may be executed on a user computer as a standalone software package, or some may be executed on a computer of a user while some is executed on a remote computer, or all the code may be executed on a remote computer or a server. It should also be noted that, in some alternative implementation solutions, each step in the flowcharts or functions specified in each block in the block diagrams may not occur in the illustrated order. For example, two consecutive steps or two blocks in the illustration, which are dependent on an involved function, may actually be executed substantially at the same time, or these blocks may sometimes be executed in reverse order.

Obviously, a person skilled in the art can make various modifications and variations to the present invention without departing from the spirit and scope of the present invention. The present invention is intended to cover these modifications and variations provided that they fall within the scope of protection defined by the following claims and their equivalent technologies.

What is claimed is:

1. A method for dynamically switching a mobile network, comprising:
  sending, by a subscription manager (SM), a mobile network switch message to a first mobile network, wherein the mobile network switch message is used to indicate that user equipment (UE) needs network switching;
  receiving, by the SM, a notification signaling message from the first mobile network, wherein the notification signaling message is sent after the first mobile network receives the mobile network switch message from the SM and in response to the first mobile network receiving an attach request from the UE to attach the UE to the first mobile network, the notification signaling message being used to notify the SM that the UE intends to connect to the first mobile network;
  in response to the SM receiving the notification signaling message, sending, by the SM, an activate profile request to a second mobile network, wherein the activate profile request includes an identity of the UE and a request to the second mobile network to activate subscription data, on the second mobile network, of the UE;
  receiving, from the second mobile network, an activate profile response, wherein the activate profile response includes a subscription profile of the UE for the second mobile network indicating the subscription data of the UE has been activated on the second mobile network; and
  in response to receiving the activate profile response, sending, by the SM, the mobile network switch message to the UE by using the first mobile network, so as to instruct the UE to switch to the second mobile network, wherein the mobile network switch message sent to the UE by the SM using the first mobile network further includes the subscription profile so as to instruct the UE to activate the subscription profile of the UE for the second mobile network.

2. The method according to claim 1, wherein the notification signaling message comprises at least one of the following items:
   location information of the UE, a Public Land Mobile Network Identifier (PLMN ID) of a network available to the UE, an Access Point Identifier (AP ID) of a wireless local area network available to the UE, and a service set identifier (SSID) of the wireless local area network available to the UE.

3. The method for dynamically switching a mobile network according to claim 1, wherein the sending, by the SM, the mobile network switch message to the first mobile network comprises:
   sending, by the SM, the mobile network switch message to the first mobile network through a pre-established data channel.

4. The method according to claim 1, wherein the mobile network switch message comprises address information of the SM.

5. A subscription manager (SM), comprising:
   a switch message sending unit, configured to send a mobile network switch message to a first mobile network, wherein the mobile network switch message is used to indicate that user equipment (UE) needs network switching;
   a signaling message receiving unit, configured to receive a notification signaling message from the first mobile network, wherein the notification signaling message is sent after the first mobile network receives the mobile network switch message from the SM and in response to the first mobile network receiving an attach request from the UE to attach the UE to the first mobile network, the notification signaling message being used to notify the SM that the UE intends to connect to the first mobile network;
   an activate profile requesting unit, configured to:
      in response to the SM receiving the notification signaling message, send an activate profile request to a second mobile network, wherein the activate profile request includes an identity of the UE and a request to the second mobile network to activate subscription data, on the second mobile network, of the UE,
      receive, from the second mobile network, an activate profile response, wherein the activate profile response includes a subscription profile of the UE for the second mobile network indicating the subscription data of the UE has been activated on the second mobile network; and
   a switch indication unit, configured to send, in response to the signaling message receiving unit receiving the notification signaling message, the mobile network switch message to the UE by using the first mobile network, so as to instruct the UE to switch to the second mobile network, wherein the mobile network switch message sent to the UE by the switch indication unit using the first mobile network further includes the subscription profile so as to instruct the UE to activate the subscription profile of the UE for the second mobile network.

6. The SM according to claim 5, wherein the notification signaling message comprises at least one of the following items:
   location information of the UE, a Public Land Mobile Network Identifier (PLMN ID) of a network available to the UE, an Access Point Identifier (AP ID) of a wireless local area network available to the UE, and an Service Set Identifier (SSID) of the wireless local area network available to the UE.

7. The SM according to claim 5, wherein the switch indication unit is configured to send the mobile network switch message to the first mobile network through a data channel.

8. The SM according to claim 5, wherein the mobile network switch message comprises address information of the SM.

9. User equipment (UE), comprising:
   a sending unit, configured to send a first-network connection request to a network device of a first mobile network, the first-network connection request is a first attach request indicating that the user equipment intends to connect to the first mobile network;
   a receiving unit, configured to:
      receive a first-network connection response message from the network device of the first mobile network, wherein the first-network connection response message comprises an attach reject and includes a mobile network switch message sent to the first mobile network from a subscription manager (SM), or the first-network connection response message comprises an an Embedded Universal Integrated Circuit Card (eUICC) request message and includes a network switch indication, and
      receive a first-network connection accept message from the network device of the first mobile network, wherein the first-network connection accept message includes the mobile network switch message that is used to instruct the UE to switch a mobile network, wherein the mobile network switch message is sent from the SM via the first mobile network; and
   a network switching unit, configured to connect to a second mobile network according to the mobile network switch message included in the first-network connection accept message,
   wherein
   the first-network connection accept message is received by the UE from the network device of the first mobile network in response to the sending unit sending to the network device of the first mobile network: a second attach request which includes the mobile network switch message when the first-network connection response message comprises the attach reject, or an eUICC response message which includes the network switch indication when the first-network connection response message comprises the eUICC request, and
   the mobile network switch message sent to the UE from the SM via the first mobile network further includes a subscription profile received by the SM from the second network so as to instruct the UE to activate the subscription profile of the UE for the second mobile network.

10. The UE according to claim 9, wherein the first-network connection accept message is an attach accept.

11. The UE according to claim 9, wherein the network device of the first mobile network is a mobility management entity device (MME).

12. The UE according to claim 9,
   wherein
   the sending unit sends a Public Land Mobile Network Identifier (PLMN ID) of the UE together with the second attach request when the first-network connection response message comprises the attach reject, or the sending unit sends the PLMN ID of the UE together with the eUICC response message when the first-network connection response message comprises the eUICC request.

13. The UE according to claim 9, wherein the network device of the first mobile network is a serving General Packet Radio System (GPRS) support node device.

14. The UE according to claim 13, further comprising:
a context requesting unit, configured to: send an activate Packet Data Protocol (PDP) context request to the network device of the first mobile network, and receive an activate PDP context request response returned by the network device, wherein the activate PDP context request comprises the mobile network switch message.

* * * * *